United States Patent
Furukawa

(10) Patent No.: US 11,080,393 B2
(45) Date of Patent: Aug. 3, 2021

(54) SECURE COMPUTATION SYSTEM, SECURE COMPUTATION APPARATUS, SECURE COMPUTATION METHOD, AND SECURE COMPUTATION PROGRAM

(71) Applicant: NEC Corporation, Tokyo (JP)

(72) Inventor: Jun Furukawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 313 days.

(21) Appl. No.: 16/336,953

(22) PCT Filed: Jul. 6, 2017

(86) PCT No.: PCT/JP2017/024874
§ 371 (c)(1),
(2) Date: Mar. 27, 2019

(87) PCT Pub. No.: WO2018/061391
PCT Pub. Date: Apr. 5, 2018

(65) Prior Publication Data
US 2019/0266326 A1     Aug. 29, 2019

(30) Foreign Application Priority Data
Sep. 30, 2016  (JP) .............................. JP2016-193094

(51) Int. Cl.
*G06F 21/55*     (2013.01)
*G06F 7/523*     (2006.01)
(Continued)

(52) U.S. Cl.
CPC ............ *G06F 21/554* (2013.01); *G06F 7/523* (2013.01); *G06F 21/64* (2013.01); *G09C 1/00* (2013.01); *G06F 2221/032* (2013.01)

(58) Field of Classification Search
CPC ........ G06F 21/554; G06F 7/523; G06F 21/64; G06F 2221/032; G06F 21/71; G09C 1/00
See application file for complete search history.

(56) References Cited

U.S. PATENT DOCUMENTS 6,941,463 B1 *   9/2005   Atallah ................. G06F 21/606
                                                         709/201
9,660,813 B1 *   5/2017   van Dijk ............. G06F 21/6254
(Continued)

FOREIGN PATENT DOCUMENTS

JP         2012-78446 A         4/2012

OTHER PUBLICATIONS

Rabin et al., "Verifiable Secret Sharing and Multiparty Protocols with Honest Majority (Extended Abstract)", STOC, 1989, pp. 73-85 (total 13 pages).
(Continued)

*Primary Examiner* — Michael Pyzocha
(74) *Attorney, Agent, or Firm* — Sughrue Mion, PLLC

(57) ABSTRACT

This invention is directed to a secure computation apparatus that protects a security against the malicious behavior while maintaining a processing amount small. The secure computation apparatus comprises a first multiplication triplet column generator that generates first multiplication triplet columns formed from a set of two secure distribution random numbers and a distribution value of a multiplication result obtained by performing secure multiplication of the two secure distribution random numbers, a second multiplication triplet column generator that generates second multiplication triplet columns formed from a set of two secure distribution input numbers and a distribution value of a multiplication result obtained by performing secure multiplication of the two secure distribution input numbers, in each multiplication process of semi-honest safe secure multiplication, and a multiplication validity verifier that generates a set of first multiplication triplets and second multiplication triplets by randomly selecting, from the first multiplication triplet columns, a number of rows of the first multiplication triplets as many as a number of rows of the second multiplication (Continued)

triplets in the second multiplication triplet columns, and verifies validity of secure multiplication based on the set of the first and second multiplication triplets.

10 Claims, 15 Drawing Sheets

(51) Int. Cl.
*G06F 21/64* (2013.01)
*G09C 1/00* (2006.01)

(56) References Cited

U.S. PATENT DOCUMENTS

| | | | |
|---|---|---|---|
| 10,439,654 B1* | 10/2019 | Cousins | H03M 13/13 |
| 2002/0041680 A1* | 4/2002 | Cybenko | G06F 21/125 |
| | | | 380/28 |
| 2011/0060917 A1* | 3/2011 | Troncoso Pastoriza | |
| | | | G06F 21/76 |
| | | | 713/189 |
| 2017/0149796 A1* | 5/2017 | Gvili | H04L 9/0625 |
| 2020/0242466 A1* | 7/2020 | Mohassel | G06F 21/6254 |

OTHER PUBLICATIONS

Goldreich et al., "How to Solve any Protocol Problem—An Efficiency Improvement", CRYPTO, 1987, LNCS 293, pp. 73-86 (total 14 pages).
Lindell et al., "Cut-and-Choose Based Two-Party Computation in the Online/Offline and Batch Settings", CRYPTO, Aug. 26, 2014, pp. 1-54 (total 55 pages).
Furukawa, "Secure Multiparty Computation for Honest Majority (Throughput no Okii Multi-party Keisan)", Symposium on Cryptography and Information Security 2016 (SCIS2016), Jan. 19, 2016, pp. 1-7 (total 7 pages).
Chida et al., "A Three-Party Secure Function Evaluation with Lightweight Verifiability Revisited (Keiryo Kensho Kano 3 Party Hitoku Kansu Keisan no Saiko)", Computer Security Symposium 2010 (CSS2010), Oct. 12, 2010, vol. 2010, No. 9, pp. 555-560 (total 6 pages).
Ikarashi et al., "Secure Database Operations Using An Improved 3-party Verifiable Secure Function Evaluation (Keiryo Kensho Kano na 3 party Hitoku Kansu Keisan no Koritsuka Oyobi kore o Mochiita Secure na Database Shori)", Symposium on Cryptography and Information Security 2011 (SCIS2011), Jan. 25, 2011, pp. 1-8 (total 8 pages).
Furukawa et al., "High-Throughput Secure Three-Party Computation for Malicious Adversaries and an Honest Majority", ePrint archive, Oct. 1, 2016, pp. 1-36 (total 36 pages), [online], [retrieval date Sep. 21, 2017 (Sep. 21, 2017)], Internet:<http://eprint.iacr.org/2016/944>.
International Search Report for PCT/JP2017/024874 dated Oct. 3, 2017 [PCT/ISA/210].
Written Opinion of the International Searching Authority for PCT/JP2017/024874 dated Oct. 3, 2017 [PCT/ISA/237].

* cited by examiner

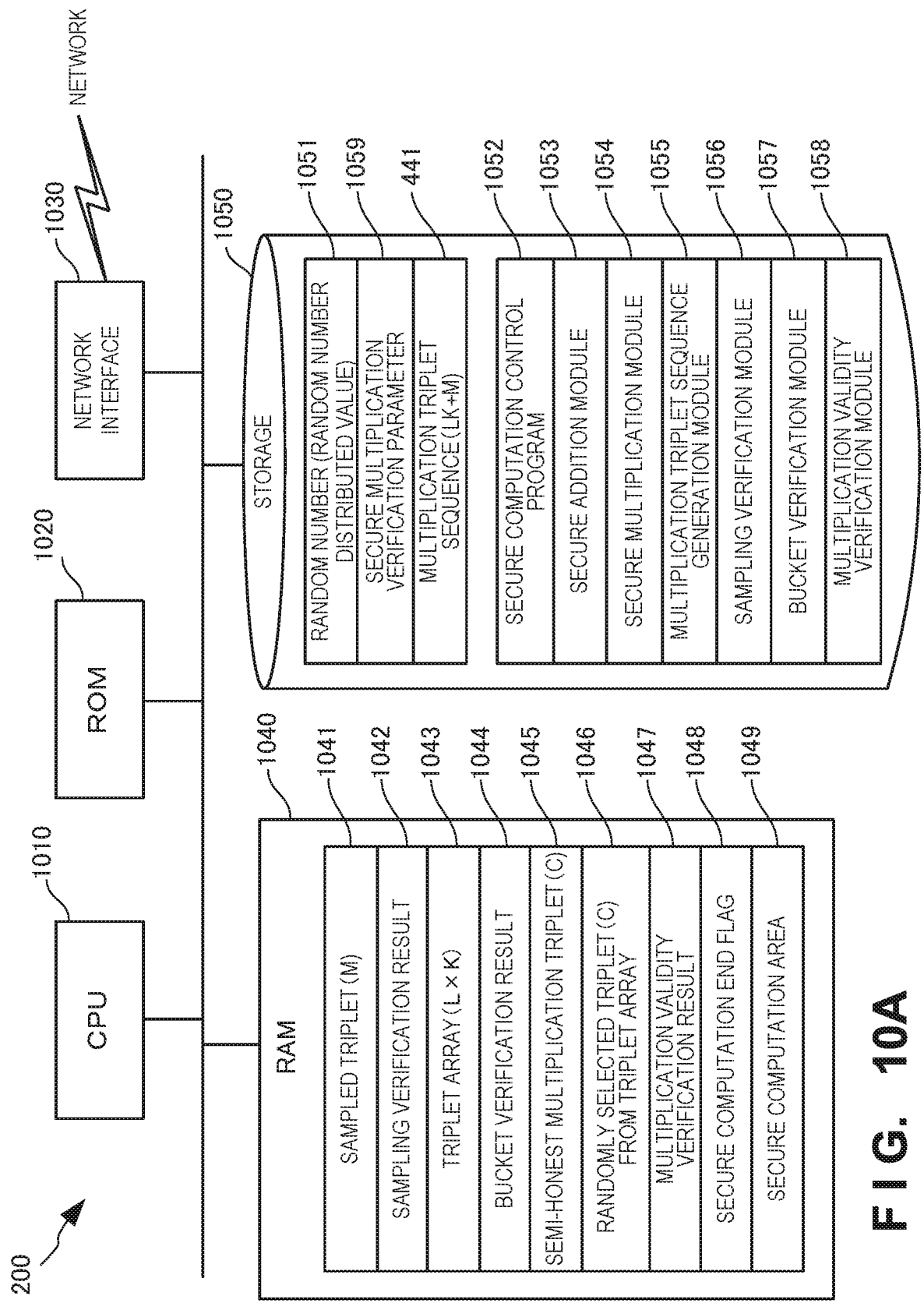
F I G. 10A

FIG. 10B

| | SECURE MULTIPLICATION CONDITION 1061 | | | SELECTION PARAMETER 1062 | | | | VALIDITY VERIFICATION RESULT 1063 | |
|---|---|---|---|---|---|---|---|---|---|
| NUMERICAL VALUE RANGE | BIT WIDTH | SECURE MULTIPLICATION ALGORISM | TARGET VALIDITY ACCURACY | NUMBER (LK+M) OF GENERATED TRIPLETS | SAMPLING COUNT (M) | TRIPLET ARRAY (L ROWS × K COLUMNS) | MULTIPLICATION COUNT (C) | VERIFICATION SPEED (INCLUDING COMMUNICATION AMOUNT) | VALIDITY ACCURACY |
| | | | | | | | | | |
| | | | | | | | | | |
| | | | | | | | | | |
| ... | | | | | | | | | |

1059

SECURE COMPUTATION SYSTEM, SECURE COMPUTATION APPARATUS, SECURE COMPUTATION METHOD, AND SECURE COMPUTATION PROGRAM

This application is a National Stage Entry of PCT/JP2017/024874 filed on Jul. 6, 2017, which claims priority from Japanese Patent Application 2016-193094 filed on Sep. 30, 2016, the contents of all of which are incorporated herein by reference, in their entirety.

TECHNICAL FIELD

The present invention relates to a secure computation system, a secure computation apparatus, a secure computation method, and a secure computation program.

BACKGROUND ART

In the above technical field, non-patent literatures 1 and 2 disclose techniques of performing secure addition and secure multiplication of secure distribution values or bits without considering the malicious behavior of a participant. Non-patent literature 3 discloses a technique of verifying secure computation in consideration of the malicious behavior of a participant.

CITATION LIST

Non-Patent Literature

Non-patent literature 1: Tal Rabin, Michael Ben-Or: Verifiable Secret Sharing and Multiparty Protocols with Honest Majority (Extended Abstract). STOC 1989: 73-85
Non-patent literature 2: Oded Goldreich, Ronen Vainish: How to Solve any Protocol Problem—An Efficiency Improvement. CRYPTO 1987: 73-86
Non-patent literature 3: Yehuda Lindelly, Ben Rivay: Cut-and-Choose Based Two-Party Computation in the Online/Oine and Batch Settings, CRYPTO 2014: 73-86

SUMMARY OF THE INVENTION

Technical Problem

In the technique described in the above non-patent literature 3, however, a processing amount becomes large to improve the verification accuracy of secure computation. Therefore, it is impossible to protect a security against the malicious behavior of participants of secure computation while maintaining a processing amount small.

The present invention enables to provide a technique of solving the above-described problem.

Solution to Problem

One example aspect of the present invention provides a secure computation apparatus comprising:
a first multiplication triplet column generator that generates first multiplication triplet columns formed from a set of two secure distribution random numbers and a distribution value of a multiplication result obtained by performing secure multiplication of the two secure distribution random numbers;
a second multiplication triplet column generator that generates second multiplication triplet columns formed from a set of two secure distribution input numbers and a distribution value of a multiplication result obtained by performing secure multiplication of the two secure distribution input numbers, in each multiplication process of semi-honest safe secure multiplication; and
a multiplication validity verifier that generates a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifies validity of secure multiplication based on the set of the first and second multiplication triplets.

Another example aspect of the present invention provides a secure computation method comprising:
generating first multiplication triplet columns formed from a set of two secure distribution random numbers and a distribution value of a multiplication result obtained by performing secure multiplication of the two secure distribution random numbers;
generating second multiplication triplet columns formed from a set of two secure distribution input numbers and a distribution value of a multiplication result obtained by performing secure multiplication of the two secure distribution input numbers, in each multiplication process in semi-honest safe secure multiplication; and
generating a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifying validity of secure multiplication based on the set of the first and second multiplication triplets.

Still other example aspect of the present invention provides a secure computation program for causing a computer to execute a method, comprising:
generating first multiplication triplet columns formed from a set of two secure distribution random numbers and a distribution value of a multiplication result obtained by performing secure multiplication of the two secure distribution random numbers;
generating second multiplication triplet columns formed from a set of two secure distribution input numbers and a distribution value of a multiplication result obtained by performing secure multiplication of the two secure distribution input numbers, in each multiplication process in semi-honest safe secure multiplication; and
generating a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifying validity of secure multiplication based on the set of the first and second multiplication triplets.

Still other example aspect of the present invention provides a secure computation system in which a plurality of secure computation apparatuses are communicably connected to each other and perform, in cooperation with each other, secure computation of numbers securely distributed to the plurality of secure computation apparatuses,
at least one of the plurality of secure computation apparatuses comprising:
a first multiplication triplet column generator that generates first multiplication triplet columns formed from a set of two secure distribution random numbers and a distribution value of a multiplication result obtained by performing secure multiplication of the two secure distribution random numbers;

a second multiplication triplet column generator that generates second multiplication triplet columns formed from a set of two secure distribution input numbers and a distribution value of a multiplication result obtained by performing secure multiplication of the two secure distribution input numbers, in each multiplication process of semi-honest safe secure multiplication; and a multiplication validity verifier that generates a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifies validity of secure multiplication based on the set of the first and second multiplication triplets.

Advantageous Effects of Invention

According to the present invention, it is possible to protect a security against the malicious behavior of participants of secure computation while maintaining a processing amount small in secure computation.

BRIEF DESCRIPTION OF DRAWINGS

FIG. 10A is a block diagram showing the hardware arrangement of the secure computation apparatus according to the second example embodiment of the present invention;

FIG. 10B is a table showing contents of a secure multiplication verification parameter according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that in this specification, "secure computation" indicates a computation method in which when a plurality of secure computation apparatuses compute the output of a given function by performing computation via communication, any of the secure computation apparatuses cannot obtain information about the input and output of the function unless a sufficient number of the secure computation apparatuses share data processed by themselves. Furthermore, "secure addition" indicates addition in "secure computation" and "secure multiplication" indicates multiplication in "secure computation".

First Example Embodiment

A secure computation apparatus 100 according to the first example embodiment of the present invention will be described with reference to FIG. 1. The secure computation apparatus 100 is an apparatus that performs secure addition and secure multiplication of secure distribution values or bits.

Figure 1:
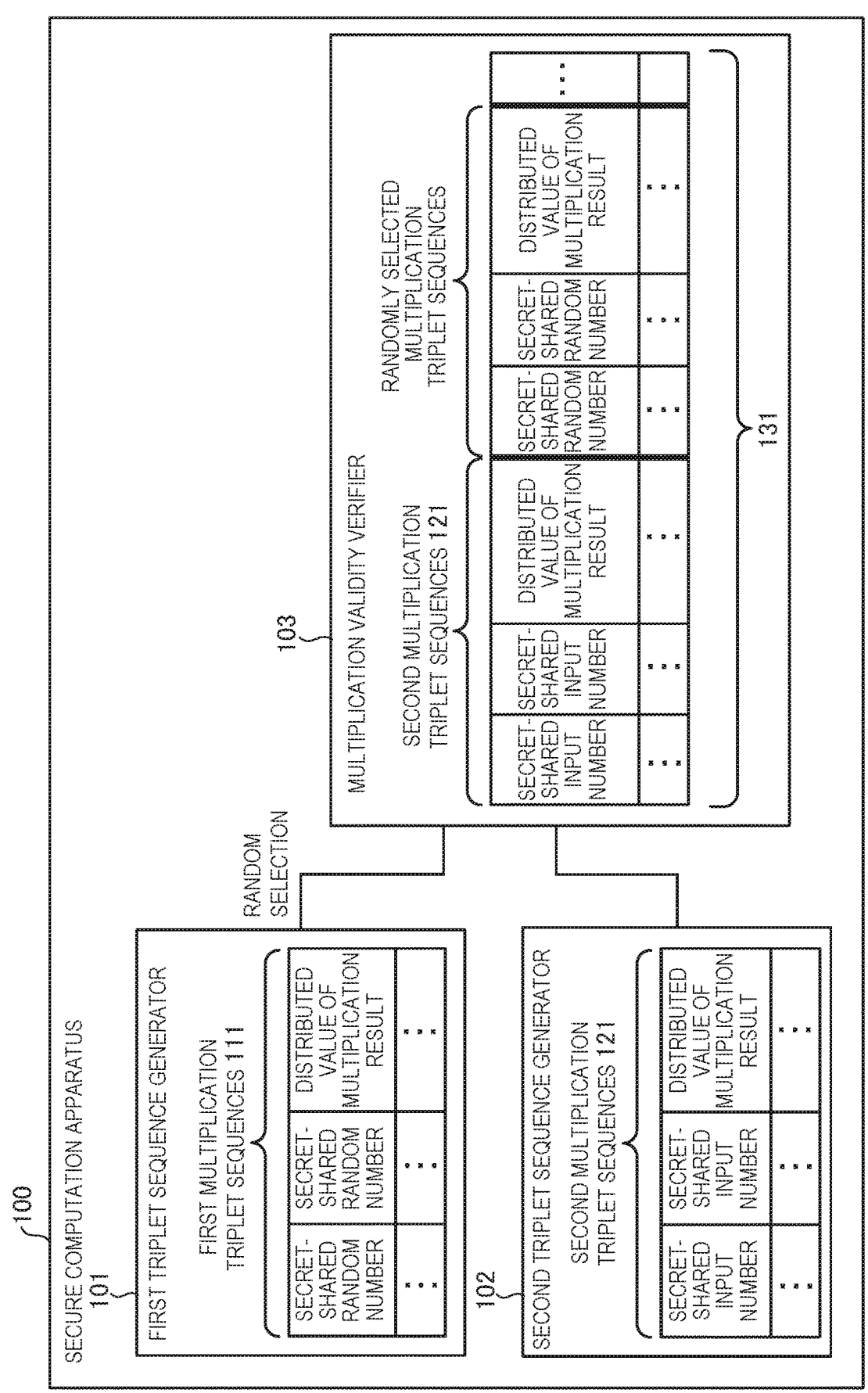
FIG. 1 is a block diagram showing the arrangement of a secure computation apparatus according to the first example embodiment of the present invention.

As shown in FIG. 1, the secure computation apparatus 100 comprises a first multiplication triplet column generator 101, a second multiplication triplet column generator 102, and a multiplication validity verifier 103. The first multiplication triplet column generator 101 generates first multiplication triplet columns 111 formed from a set of two secure distribution random numbers and a distribution value of a multiplication result obtained by performing secure multiplication of the two secure distribution random numbers. The second multiplication triplet column generator 102 generates second multiplication triplet columns 121 formed from a set of two secure distribution input numbers and a distribution value of a multiplication result obtained by performing secure multiplication of the two secure distribution input numbers, in each multiplication process in semi-honest safe secure multiplication. The multiplication validity verifier 103 generates a set 131 of first multiplication triplets and second multiplication triplets by randomly selecting, from the first multiplication triplet columns 111, a number of rows of the first multiplication triplets as many as a number of rows of the second multiplication triplets in the second multiplication triplet columns 121, and verifies validity of secure multiplication based on the set 131 of the first and second multiplication triplets.

According to this example embodiment, since the validity of secure multiplication is verified using a result of performing semi-honest safe secure multiplication, it is possible to protect a security against the malicious behavior of participants of secure computation while maintaining a processing amount small in secure computation.

Second Example Embodiment

A secure computation apparatus according to the second example embodiment of the present invention will be described next. In this example embodiment, there is provided a multiplication triplet verifier that verifies a fraud from a predetermined number of rows of multiplication triplets randomly selected from the first multiplication triplet columns. If the multiplication triplet verifier discovers no fraud, the validity of secure multiplication is then verified. This multiplication triplet verifier includes a sampling verifier that randomly samples the first number of rows of multiplication triplets from the first multiplication triplet columns, and verifies a fraud based on the sampled multiplication triplets. The first number is set in correspondence with the accuracy with which the sampling verifier verifies a fraud. The multiplication triplet verifier also includes a bucket verifier that, if the sampling verifier discovers no fraud, generates a random array including at least two columns using non-sampled multiplication triplets, and verifies a fraud based on the random array generated by the non-sampled multiplication triplets. The number of columns of the array is set in correspondence with the accuracy with which the bucket verifier verifies a fraud.

<<Explanation of Technical Premises>>

Technical premises for understanding this example embodiment will be described below. The techniques disclosed in non-patent literatures 1 to 3 will be described first.

Non-Patent Literature 1

In the method of non-patent literature 1, a secret S as a value on a given field is distributed to a plurality of apparatuses using a polynomial F on the field such that $F(0)=S$. Assume that N represents the number of apparatuses, and if the number of apparatuses is smaller than K, it is impossible to obtain information about the input and output of the function. This technique is called secret sharing. Different values on the field are assigned to the respective apparatuses, and a value on the field assigned to an apparatus i is represented by $X[i]$. When distributing a secret A to a plurality of apparatuses, $F[i]:=F(X[i])$ associated with a randomly selected $(K-1)$-order polynomial F such that $F(0)=A$ is distributed to each i-th apparatus. Similarly, as for a secret B, $G[i]:=G(X[i])$ associated with a $(K-1)$-order polynomial G such that $G(0)=B$ is distributed to each i-th apparatus. With respect to the secret, when K or more apparatuses gather, it is possible to solve the $(K-1)$-order polynomial to obtain the coefficient of F or G, thereby computing $F(0)$ or $G(0)$.

To compute a distributed value of $(A+B)$, each i-th apparatus computes $H[i]=F[i]+G[i]$. This value is $H(X[i])$ obtained by substituting $X[i]$ into the polynomial H with a coefficient obtained by adding the coefficients corresponding to F and G, and is obtained by distributing $(A+B)$ to the plurality of apparatuses, similarly to A or B. Similar to A or B, when K or more apparatuses gather, it is possible to solve the $(K-1)$-order polynomial to obtain the coefficient of H, thereby computing $H(0)$.

If $K*2 \leq N+1$ is satisfied, each i-th apparatus computes $H[i]=F[i]*G[i]$ to compute a distributed value of $(A*B)$. This value is $H(X[i])$ obtained by substituting $X[i]$ into a 2K-order polynomial $H(X)=F(X)*G(X)$, and is obtained by distributing $(A*B)$ to the plurality of apparatuses, similarly to A or B. However, unlike A or B, the order of H is 2K. Thus, when 2K or more apparatuses gather, it is possible to solve the 2Kth-order polynomial to obtain the coefficient of H, thereby computing $H(0)$. The method of distributing $(A*B)$ is different from that for A or B. To distribute this value using the $(K-1)$-order polynomial, each i-th apparatus generates a $(K-1)$-order polynomial G from $H[i]$, and distributes $G(X[j])$ to another j-th apparatus. In this way, it is possible to compute all functions including addition and multiplication.

[Non-Patent Literature 2]

Non-patent literature 2 describes a method when the number of apparatuses is two. In this method, if the two apparatuses distribute and hold a bit, that is, an element b on $GF(2)$, b and c that satisfies $b+c=b \mod 2$ are distributed to the apparatuses and held. In this method, if given bits A and B are distributed to apparatuses 1 and 2, apparatus 1 holds C and E and apparatus 2 holds D and F by assuming that $A=(C+D) \mod 2$ and $B=(E+F) \mod 2$. At this time, an exclusive OR G of A and B is given by $G=(A+B) \mod 2$, and $H=(C+E) \mod 2$ and $J=(D+F) \mod 2$ are distributed to apparatuses 1 and 2. Each apparatus can compute distribution of the exclusive OR of the two values distributed by light computation without communicating with the other apparatus.

Similarly, if A and B are distributed and held, the following processing is executed to distribute an AND $K=A \cdot B$ of the two bits, that is, L and M that satisfy $L+M=K \mod 2$ so that apparatus 1 obtains L and apparatus 2 obtains M. Apparatus 1 randomly generates L. At this time, since $M=(C+D) \cdot (E+F)=L \mod 2$, in accordance with the values D and F held by apparatus 2, apparatus 1 returns, to the apparatus, without knowing the value of M, $M=(C+0) \cdot (E+0)+L \mod 2$ for $(D, F)=(0, 0)$, $M=(C+0) \cdot (1+E)+L \mod 2$ for $(D, F)=(0, 1)$, $M=(1+C) \cdot (E+0)+L \mod 2$ for $(D, F)=(1, 0)$, and $M=(1+C) \cdot (1+E)+L \mod 2$ for $(D, F)=(1, 1)$. A method in which apparatus 1 sends a value dependent on the input of apparatus 2 to apparatus 2 and apparatus 1 cannot know the input of apparatus 2 is implemented by a technique called oblivious transfer between apparatuses 1 and 2. However, a large amount of computation and a large amount of communication are generally required for the apparatuses.

[Non-Patent Literature 3]

Non-patent literatures 1 and 2 assume that each apparatus behaves honestly. However, non-patent literature 3 describes a method in which if a predetermined number or more of apparatuses behave honestly, even if other apparatuses behave maliciously (such that an apparatus does not send a correct value to another apparatus when communicating with each other), security is maintained (that is, a secret value held by the another apparatus cannot be obtained by sending a false value).

Non-patent literature 3 describes, for example, some methods of verifying the validity of secure multiplication by assigning many prepared circuits to a plurality of small buckets.

(Problems of Non-Patent Literatures)

In non-patent literatures 1 and 2, since it is assumed that participants of secure computation are honest, it is impossible to protect a security against the malicious behavior of any participant. In non-patent literature 3, since a processing amount becomes larger to improve the verification accuracy of secure computation, it is a problem that the processing amount is large to protect a security against the malicious behavior of some participants.

A technical premise used in this example embodiment will be described next.

[(t, n) Secret Sharing Scheme]

There are provided n apparatuses P(1), P(2), ..., P(n). A given ring in which addition and multiplication are defined is represented by R. A function SecretShare ( ) is assumed to be a function of outputting n values each called "a share," when elements of R are given.

When X (x(1), ..., x(n)) represents an element of R, (x(1), ..., x(n))=SecretShare (x) is described. At this time, (x(1), ..., x(n)) are called "shares" of a result of performing (t, n) secret sharing for x, and satisfies the following properties.

1. There exists a function Recover ( ), and arbitrary t shares are selected from the n shares (t<n), and input to Recover ( ), thereby obtaining x.

2. It is difficult to reconstruct x from less than t shares.

If x undergoes (t, n) secret sharing, this means that P(i) holds x(i) for i=1, ..., n. This is represented by [x].

(2, 3) secret sharing of x will be exemplified, and x is assumed to be input to SecretShare ( ). Random numbers a(1) and a(2) are randomly selected, and a(3)=0−a(1)−a(2) is obtained. (2, 3) secret sharing provides x(1)=(a(1), a(3)−x), x(2)=(a(2), a(1)−x), and x(3)=(a(3), a(2)−x).

[Semi-Honest Reconstruction]

Processing in which each of participants obtains x from secret sharing [x] under the involvement of some or all of participants will be referred to as "reconstruction" hereinafter. If all of the participants involved in reconstruction execute this processing honestly and the all of the participants can obtain correct reconstruction results, this processing will be referred to as "semi-honest reconstruction" hereinafter.

In the example of (2, 3) secret sharing, an example of semi-honest reconstruction when all of participants are involved will be explained. In accordance with the previous example, assume that [x] is securely distributed as x(1)=(a(1), a(3)−x), x(2)=(a(2), a(1)−x), and x(3)=(a(3), a(2)−x).

P(1) sends a(1) to P(2). P(2) sends a(2) to P(3). P(3) sends a(3) to P(1). Then, P(1) computes a(3)−(a(3)−x)=x. P(2) computes a(1)−(a(1)−x)=x. P(3) computes a(2)−(a(2)−x)=x.

[Semi-Honest Secure Computation]

(Secure Addition)

When [x] and [y] are given, it is assumed that P(1), ..., P(n) can compute [z]=[x+y] by performing computation using their distributed shares without communicating with each other. Also, it is assumed that as long as all the participants execute this computation processing honestly, even if any participants the number of which is smaller than t share their distributed knowledge, it is impossible to obtain new knowledge about x, y, and z. This processing is represented by [z]=[x]+[y], and will be referred to as "addition of secure computation" hereinafter.

For example, it is assumed that x and y undergo (2, 3) secret sharing, the shares of x of P(1) are (x(11), x(12)), the shares of x of P(2) are (x(21), x(22)), the shares of x of P(3) are (x(31), x(32)), the shares of y of P(1) are (y(11), y(12)), the shares of y of P(2) are (y(21), y(22)), and the shares of y of P(3) are (y(31), y(32)).

At this time, the shares of (x+y) of P(1) can be computed as (x(11)+y(11), x(12)+y(12)), the shares of (x+y) of P(2) can be computed as (x(21)+y(21), x(22)+y(22)), and the shares of (x+y) of P(3) can be computed as (x(31)+y(31), x(32)+y(32)). For example, if P(3) sends x(31)+y(31)=a(3)+b(3) to P(1), P(1) can perform semi-honest reconstruction to obtain x(31)+y(31)−{x(12)+y(12)}=a(3)+b(3)−{a(3)−x+b(3)−y}=x+y.

If [x] and y known by all the apparatuses are given, it is assumed that P(1), ..., P(n) can compute [z]=[x+y] by performing computation using their distributed shares without communicating with each other. This processing is represented by [z]=[x]+y or [z]=y+[x], and will be referred to as "local addition of secure computation" hereinafter.

For example, it is assumed that x and y undergo (2, 3) secret sharing, the shares of x of P(1) are (x(11), x(12)), the shares of x of P(2) are (x(21), x(22)), and the shares of x of P(3) are (x(31), x(32)). At this time, the shares of (x+y) of P(1) can be computed as (x(11), x(12)−y), the shares of (x+y) of P(2) can be computed as (x(21), x(22)−y), and the shares of (x+y) of P(3) can be computed as (x(31), x(32)−y). For example, if P(3) sends x(31)=a(3) to P(1), P(1) can perform semi-honest reconstruction to obtain x(31)−{x(12)−y}=a(3)−{a(3)−x−y}=x+y.

(Secure Multiplication)

If [x] and y known by all the apparatuses are given, it is assumed that P(1), ..., P(n) can compute [z]=[x·y] by performing computation using their distributed shares without communicating with each other. This processing is represented by [z]=[x]·y or [z]=y [x], and will be referred to as "local multiplication of secure computation" hereinafter.

For example, each apparatus multiplies the shares of x of itself by y, and the shares of (x*y) of P(1) can be computed as (x(11)*y, x(12)*y), the shares of (x*y) of P(2) can be computed as (x(21)*y, x(22)*y), and the shares of (x*y) of P(3) can be computed as (x(31)*y, x(32)*y). For example, if P(3) sends x(31)*y=a(3)*y to P(1), P(1) can perform semi-honest reconstruction to obtain x(31)*y−{x(12)*y}=a(3)*y−{a(3)−x}*y=x*y.

If [x] and [y] are given, it is assumed that P(1), ..., P(n) can compute [z]=[x·y] by communicating with each other and performing computation using their distributed shares. Assume that "·" represents multiplication. Also, it is assumed that as long as all the participants execute this computation processing honestly, even if any participants the number of which is smaller than t share their distributed knowledge, it is impossible to obtain new knowledge about x, y, and z. This processing is represented by [z]=[x]*[y], and will be referred to as "multiplication of semi-honest safe secure computation" hereinafter.

For example, it is assumed that assume that x and y undergo (2, 3) secret sharing, the shares of x of P(1) are (x(11), x(12)), the shares of x of P(2) are (x(21), x(22)), the shares of x of P(3) are (x(31), x(32)), the shares of y of P(1) are (y(11), y(12)), the shares of y of P(2) are (y(21), y(22)), and the shares of y of P(3) are (y(31), y(32)).

At this time, the shares of (x·y) of P(1), those of P(2), and those of (x·y) of P(3) can be computed, as follows. It is assumed that there are provided r(1), r(2), and r(3) that satisfy r(1)+r(2)+r(3)=0, and P(1), P(2), and P(3) hold r(1), r(2), and r(3), respectively.

P(1) computes t(1)=(−x(11)y(11)+x(12)y(12)−r(1))/3, and sends t(1) to P(2). P(2) computes t(2)=(−x(21)y(21)+x(22)y(22)−r(2))/3, and sends t(2) to P(3). P(3) computes t(3)=(−x(31)y(31)+x(32)y(32)−r(3))/3, and sends t(3) to P(1).

P(1) has (t(3)−t(1), −2t(3)−t(1)) as the shares of (x·y). P(2) has (t(1)−t(2), −2t(1)−t(2)) as the shares of (x·y). P(3) has (t(2)−t(3), −2t(2)−t(3)) as the shares of (x·y).

For example, if P(3) sends, to P(1), t(2)−t(3)={(−x(21)y(21)+x(22)y(22)−r(2))/3}−{(−x(31)y(31)+x(32)y(32)−r(3))/3}, P(1) can perform semi-honest reconstruction to obtain:

$$
\begin{aligned}
t(2) - t(3) - \{-2t(3) - t(1)\} &= t(1) + t(2) + t(3) \\
&= \{(-x(11)y(11) + x(12)y(12) - \\
&\quad r(1))/3\} + \{(-x(21)y(21) + \\
&\quad x(22)y(22) - r(2))/3\} + \\
&\quad \{(-x(31)y(31) + x(32)y(32) - \\
&\quad r(3))/3\} \\
&= \{((-a(1)b(1) + (a(1) - x)(b(1) - y) - \\
&\quad r(1))/3\} + \{((-a(2)b(2) + \\
&\quad (a(2) - x)(b(2) - y) - r(2))/3\} + \\
&\quad \{((-a(3)b(3) + (a(3) - x)(b(3) - \\
&\quad y) - r(3))/3\} \\
&= \{(-b(1)x - a(1)y + x \cdot y - r(1))/3\} + \\
&\quad \{(-b(2)x - a(2)y + x \cdot y - r(2))/3\} + \\
&\quad \{(-b(3)x - a(3)y + x \cdot y - r(3))/3\} \\
&= -\{(b(1) + b(2) + b(3)\}x/3 - \\
&\quad \{a(1) + a(2) + a(3)\}y/3 + x \cdot y - \\
&\quad \{r(1) + r(2) + r(3)\}/3 \\
&= x \cdot y
\end{aligned}
$$

<<Explanation of Example Embodiment>>

The arrangement and operation of the secure computation apparatus according to this example embodiment will be described in detail with reference to the above-described technical premises.

<<Functional Arrangement of Secure Computation Apparatus>>

Figure 2:
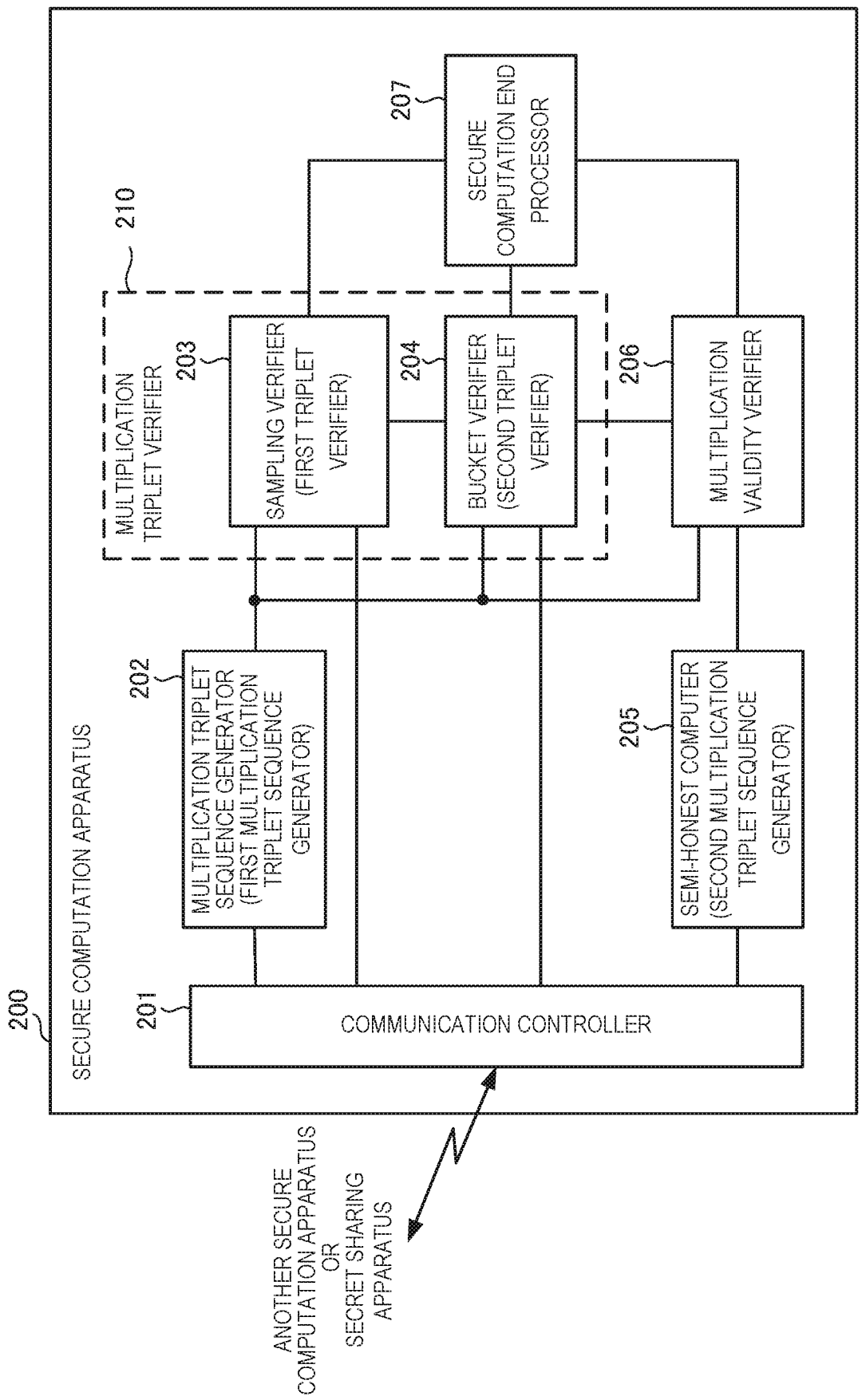
FIG. 2 is a block diagram showing the functional arrangement of a secure computation apparatus according to the second example embodiment of the present invention.

FIG. 2 is a block diagram showing the functional arrangement of a secure computation apparatus 200 according to this example embodiment.

The secure computation apparatus 200 includes a communication controller 201, a multiplication triplet column generator 202, a sampling verifier 203, a bucket verifier 204, a semi-honest computing module 205, a multiplication validity verifier 206, and a secure computation end processing module 207.

The communication controller 201 controls communication with another secure computation apparatus or a secure distribution apparatus via a network. The multiplication triplet column generator 202 corresponds to the first multiplication triplet column generator 101, and generates multiplication triplet columns each formed from a set of two secure distribution random numbers and a distributed value of a multiplication result obtained by performing secure multiplication of the two secure distribution random numbers. The sampling verifier 203 corresponds to the first triplet verifier, and randomly samples a predetermined number of rows of multiplication triplets from the multiplication triplet columns, and verifies a fraud based on the sampled multiplication triplets. The bucket verifier 204 corresponds to the second triplet verifier and, if the sampling verifier 203 discovers no fraud, generates a random array including at least two columns using non-sampled multiplication triplets, and verifies a fraud based on the random array generated using the non-sampled multiplication triplets.

The semi-honest computing module 205 corresponds to the second multiplication triplet column generator 102, and generates multiplication triplet columns formed from a set of two secure distribution input numbers and a multiplication result obtained by performing secure multiplication of the two secure distribution input numbers, in each multiplication process in semi-honest safe secure multiplication. The multiplication validity verifier 206 randomly selects, from the multiplication triplet array generated by the bucket verifier 204, a number of rows of first multiplication triplets in the first multiplication triplet columns as many as a number of rows of second multiplication triplets in the second multiplication triplet columns of the multiplication result generated by the semi-honest computing module 205, and verifies the validity of the multiplication result based on the set of the first and second multiplication triplets. The secure computation end processing module 207 performs secure computation end processing, if at least one of the sampling verifier 203, the bucket verifier 204 and the multiplication validity verifier 206 discovers a fraud during secure computation.

Note that in this example embodiment, if either the sampling verifier 203 or the bucket verifier 204 discovers no fraud, the multiplication validity verifier 206 further verifies a fraud. If the sampling verifier 203 discovers no fraud, the bucket verifier 204 further verifies a fraud. However, the present invention is not limited to this relationship or order. Furthermore, in this example embodiment, the multiplication triplet array generated by the bucket verifier 204 is generated using non-sampled multiplication triplets. However, the present invention is not limited to this, but may use all of the first multiplication triplets.

(System Including Secure Computation Apparatus)

Figure 3:
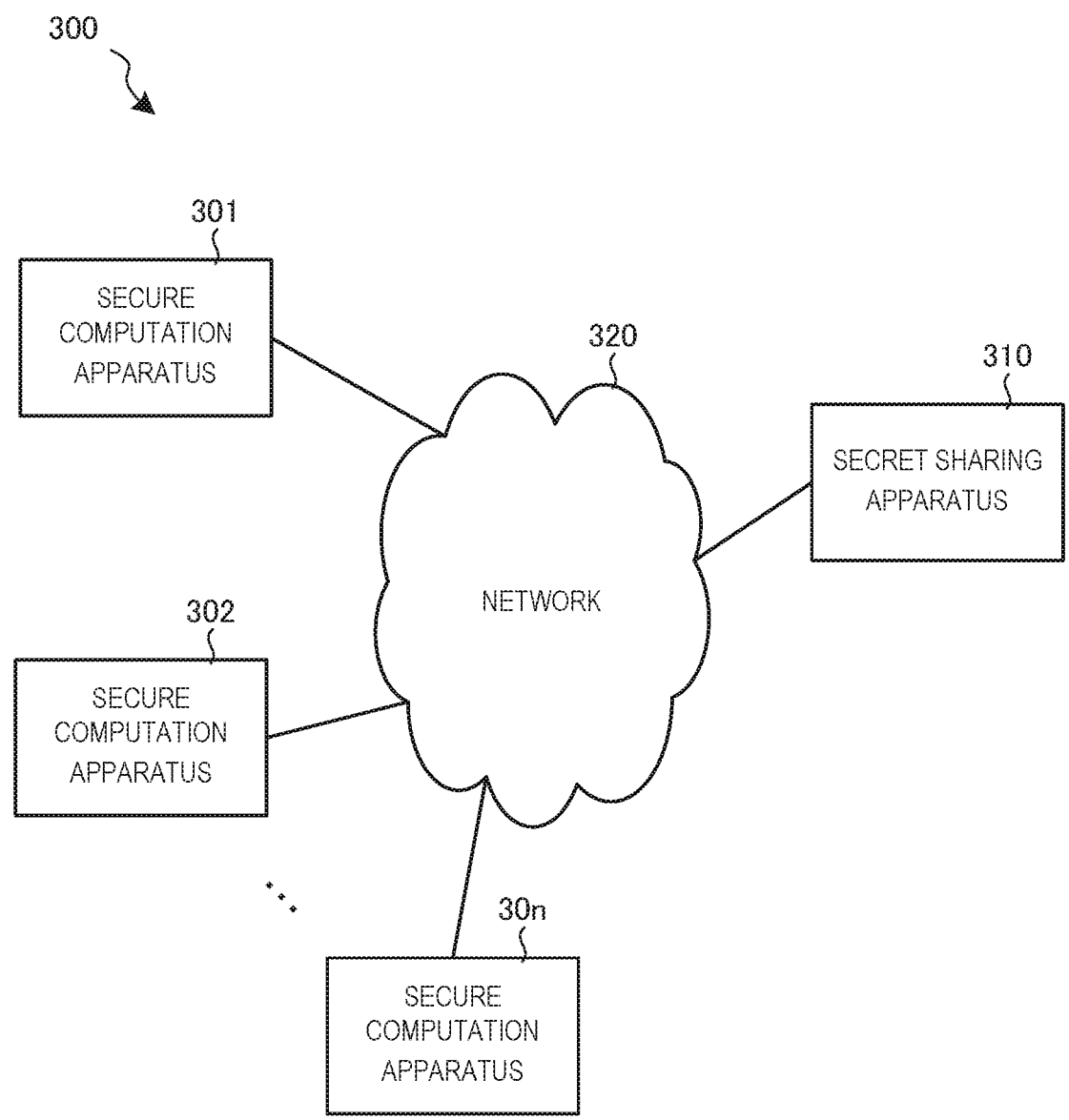
FIG. 3 is a block diagram showing the arrangement of a secure computation system including the secure computation apparatus according to the second example embodiment of the present invention.

FIG. 3 is a block diagram showing the arrangement of a secure computation system 300 including the secure computation apparatus 200 according to this example embodiment.

In the secure computation system 300 according to this example embodiment, a plurality of secure computation apparatuses 301 to 30n and a secure distribution apparatus 310 are communicably connected via a network 320. So, in the secure computation system 300, secure computation, particularly secure multiplication, is implemented while the plurality of secure computation apparatuses 301 to 30n communicate secure information in cooperation with each other.

(Multiplication Triplet Column Generation)

Figure 4:
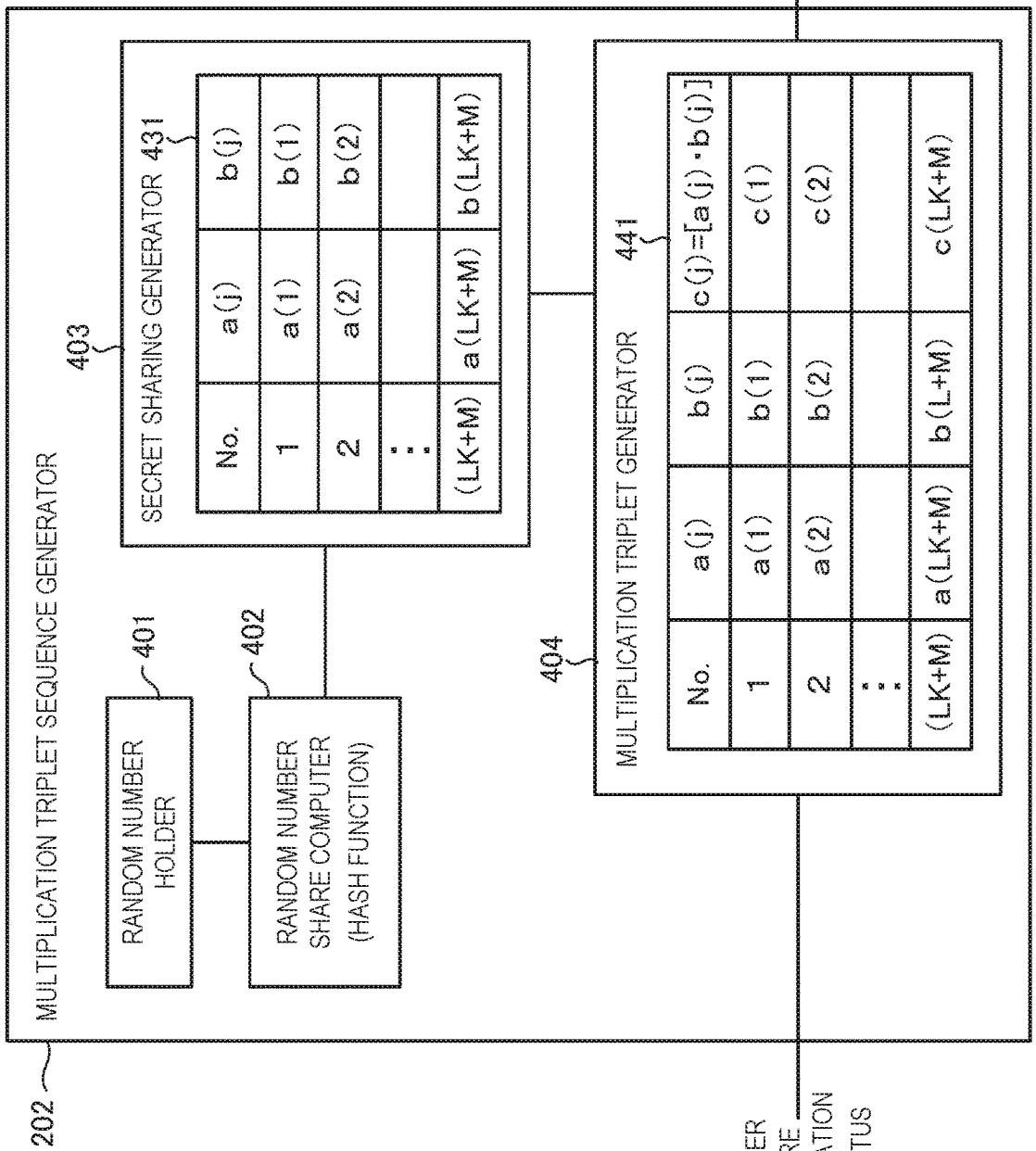
FIG. 4 is a block diagram showing the functional arrangement of a multiplication triplet column generator according to the second example embodiment of the present invention.

FIG. 4 is a block diagram showing the functional arrangement of the multiplication triplet column generator 202 according to this example embodiment.

The multiplication triplet column generator 202 includes a random number holder 401, a random number share computing module 402, a secure distribution generator 403, and a multiplication triplet generator 404. The random number holder 401 holds a random number to be used by the random number share computing module 402. The random number share computing module 402 computes shares of a random number from the random number held in the random number holder 401 using a hash function. The secure distribution generator 403 generates secure distribution values using the shares of the random number. For example, the secure distribution generator 403 generates (LK+M) secure distribution value columns (a(j), b(j)) ($1 \leq j \leq LK+M$) 431. The multiplication triplet generator 404 generates c(j) that satisfies $[a(j) \cdot b(j)] = [c(j)]$, thereby generating multiplication triplet columns {a(j), b(j), c(j)} ($1 \leq j \leq LK+M$) 441. The generated multiplication triplets {a(j), b(j), c(j)} are used in the sampling verifier 203, the bucket verifier 204 and the multiplication validity verifier 206.

An example of the multiplication triplet column generation processing according to this example embodiment will be described below.

It is assumed that there is provided a method of generating an arbitrary number of secure distribution values [r] of a random element r of a given ring R.

For example, in the case of (2, 3) secret sharing, the following processing is performed.

It is assumed that P(1), P(2), and P(3) hold in advance random numbers S(3) and S(1), random numbers S(1) and S(2), and random numbers S(2) and S(3), respectively. Using a hash function Hash ( ) that outputs elements of R, the shares of P(1), P(2), and P(3) of the m-th random number are computed as {Hash(S(3), m)−Hash(S(1), m)}, {Hash(S(1), m)−Hash(S(2), m)} and {Hash(S(2), m)−Hash(S(3), m)}, respectively.

Assuming that L, K, and M represent integers, and N participants generates 2(LK+M) secure distribution values of random elements of a given ring. These values are represented by [a(1)], [b(1)], [a(2)], [b(2)], . . . , [a(LK+M)], [b(LK+M)]. The participants compute [c(j)]=[a(j)]·[b(j)] by executing multiplication [a(j)]*[b(j)] of semi-honest safe secure computation for all j=1, . . . , LK+M. For each j, ([a(j)], [b(j)], [c(j)]) is called a multiplication triplet.

(Multiplication Triplet Sampling Verification)

Figure 5:
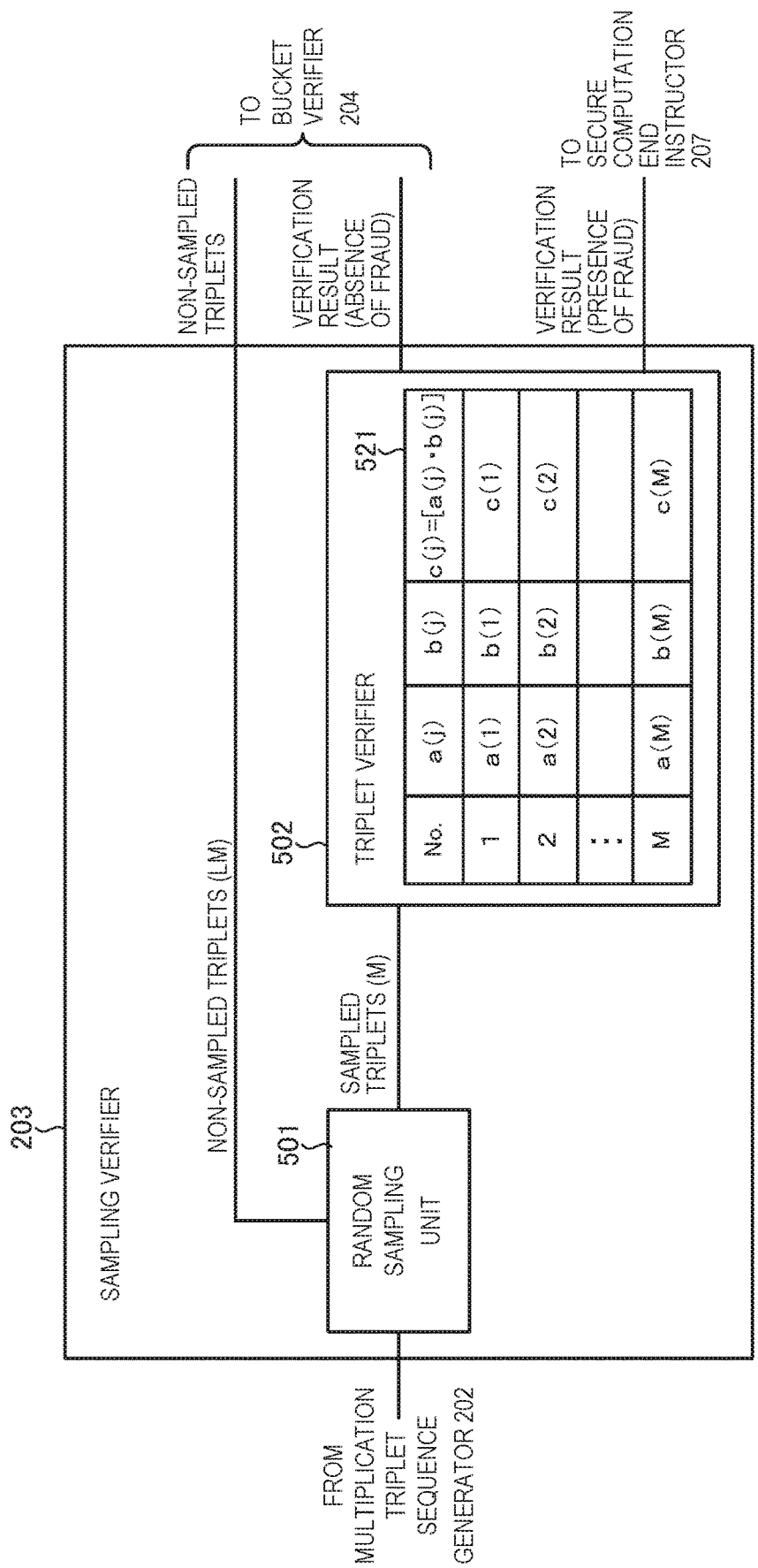
FIG. 5 is a block diagram showing the functional arrangement of a sampling verifier according to the second example embodiment of the present invention.

FIG. 5 is a block diagram showing the functional arrangement of the sampling verifier 203 according to this example embodiment.

The sampling verifier 203 includes a random sampling unit 501 and a triplet verifier 502. The random sampling unit 501 randomly samples M multiplication triplets from the multiplication triplet columns {a(j), b(j), c(j)} (1≤j≤LK+M) 441 generated by the multiplication triplet generator 404, thereby generating multiplication triplet columns {a(j), b(j), c(j)} (1≤j≤M) 521. Then, the random sampling unit 501 sends LK non-sampled multiplication triplets to the bucket verifier 204. The triplet verifier 502 determines, using the multiplication triplet columns {a(j), b(j), c(j)} (1≤j≤M) 521, whether each multiplication triplet includes an error, and verifies the presence/absence of a fraud.

An example of the multiplication triplet sampling verification processing according to this example embodiment will be described below.

M multiplication triplets are randomly selected from the (LK+M) multiplication triplets, and all or some of the participants perform semi-honest reconstruction. Each participant obtains a(j), b(j), and c(j) for the selected multiplication triplets, that is, for a plurality of selected indices j. If there is at least a participant who has discovered at least one multiplication triplet that does not satisfy a(j)·b(j)=c(j), it is determined that there is a fraud in multiplication triplet generation, thereby ending the secure computation program. Note that the LK multiplication triplets obtained by excluding M selected and reconstructed multiplication triplets from the (LK+M) multiplication triplets will be used thereafter.

If LK and M are set large to some extent, even if M is much smaller than LK, the probability is very low, with which there is a predetermined ratio or more of multiplication triplets not generated honestly by the participants among the LK multiplication triplets but a fraud is not discovered in reconstruction processing, thereby making it possible to sufficiently verify frauds. However, to improve the fraud discovery probability that is not sufficient in multiplication triplet sampling verification, the following multiplication triplet bucket verification is performed.

(Multiplication Triplet Bucket Verification)

Figure 6:
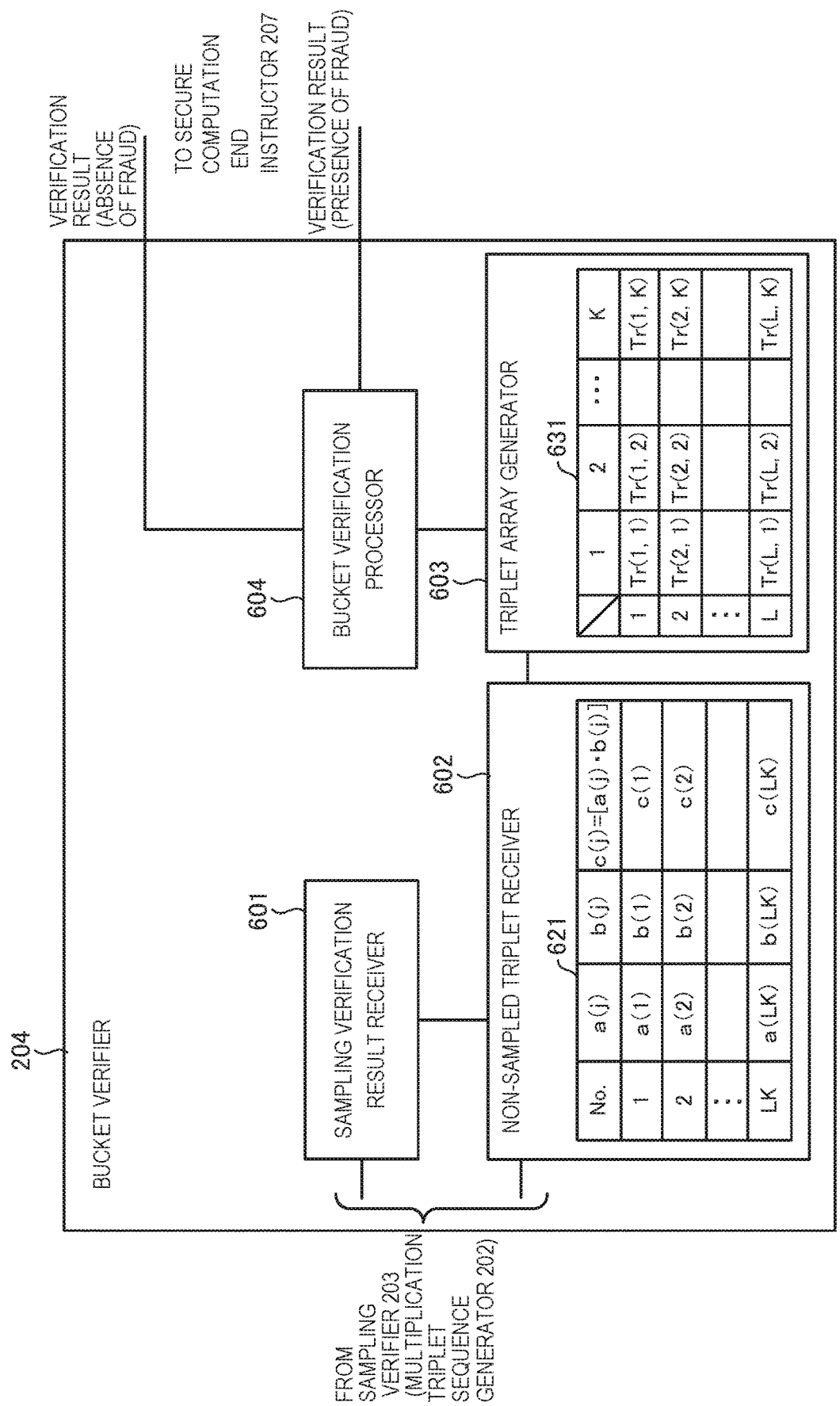
FIG. 6 is a block diagram showing the functional arrangement of a bucket verifier according to the second example embodiment of the present invention.

FIG. 6 is a block diagram showing the functional arrangement of the bucket verifier 204 according to this example embodiment.

The bucket verifier 204 includes a sampling verification result receiver 601, a non-sampled triplet receiver 602, a triplet array generator 603, and a bucket verification processing module 604. The sampling verification result receiver 601 receives the result of sampling verification from the sampling verifier 203. If the result indicating the absence of a fraud is received, the bucket verifier 204 is activated. The non-sampled triplet receiver 602 receives the LK non-sampled multiplication triplets from the sampling verifier 203, and holds multiplication triplet columns {a(j), b(j), c(j)} (1≤j≤LK) 621. Note that in the non-sampled triplet receiver 602, the LK non-sampled multiplication triplets may be obtained by excluding the M sampled multiplication triplets from all multiplication triplets in the multiplication triplet columns obtained from the multiplication triplet column generator 202.

The triplet array generator 603 randomly generates a multiplication triplet array Tr(p, q)={a(p, q), b(p, q), c(p, q)} (p=1, . . . , L, q=1, . . . , K) 631 of L rows×K columns from the multiplication triplet columns {a(j), b(j), c(j)} (1≤j≤LK) 621 of the non-sampled triplet receiver 602. The bucket verification processing module 604 executes bucket verification using the multiplication triplet array Tr(p, q) (p=1, . . . , L, q=1, . . . , K) 631 of L rows x K columns.

An example of the multiplication triplet bucket verification processing according to this example embodiment will be described below.

The LK multiplication triplets are randomly rearranged to generate K columns of L rows multiplication triplets. That is, for p=1, . . . , L and q=1, . . . , K, [a(p, q)], [b(p, q)] and [c(p, q)] are respectively assigned to [a(j)], [b(j)] and [c(j)] for j selected from 1, . . . , LK.

For all p=1, . . . , L, processing up to [end of large loop] below is executed.

For all q=2, . . . , K, processing up to [end of small loop] below is executed.

Perform secure computation of [d(p, q)]=[a(p, 1)]+[a(p, q)] and [e(p, q)]=[b(p, 1)]+[b(p, q)], and semi-honest reconstruction to obtain d(p, q) and e(p, q).

The reconstruction result obtained by the f-th participant is represented by d(p, q, f) and e(p, q, f).

The f-th participant performs secure computation, as follows, using d(p, q, f) and e(p, q, f) as d(p, q) and e(p, q).

[c'(p, q)]=[c(p, 1)]−d(p, q)·e(p, q)+[a(p, q)]·e(p, q)+[b(p, q)]·d(p, q)−[c(p, q)]

[end of small loop]

[end of large loop]

For all p=1, . . . , L and q=2, . . . , K, it is confirmed that d(p, q, f) and e(p, q, f) are not different depending on f. For example, this is executed, as follows.

With respect to a combination of each f-th participant and an f'-th participant, for all p=1, . . . , L and q=2, . . . , K, it is confirmed that d(p, q, f) and e(p, q, f) are equal to each other.

It is assumed that D(p, q, f) is obtained by arranging all d(p, q, f) for p=1, . . . , L and q=2, . . . , K. Each f-th participant and the f'-th participant share a secret key S only between them, the hash value of (S, D(p, q, f)) and that of (S, D(p, q, f')) are computed and exchanged, and then it is confirmed that the hash vales are equal to each other.

For all p=1, . . . , L and q=2, . . . , K, it is confirmed that [c'(p, q)] is obtained by secret sharing of 0 (zero). If it turns out that a value other than 0 is included, it is determined that a fraud is discovered, thereby ending the secure computation program.

For example, it is possible to perform confirmation by performing semi-honest reconstruction to obtain all [c'(p, q)].

If it is desirable to eliminate communication necessary for reconstruction, for example, the following processing can be performed. An example of (3, 2) secret sharing will be described below.

Assuming that the shares of x(p, q) of P(1) are (x(11pq), x(12pq)), the shares of x(p, q) of P(2) are (x(21pq), x(22pq)), and the shares of x(p, q) of P(3) are (x(31pq), x(32pq)), if 0 undergoes secret sharing, x(11pq)=x(22pq), x(21pq)=x(32pq), and x(31pq)=x(12pq) are obtained. Therefore, P(1) and P(2) compute a hash value of a value obtained by arranging x(11pq) for p=1, ..., L and q=2, ..., K and a hash value of a value obtained by arranging x(22pq) for p=1, ..., L and q=2, ..., K, exchange them, and compare that the hash values are equal to each other. With respect to P(2) and P(3), and, P(3) and P(1), comparison is performed in the same way to perform confirmation.

Similarly, if it is confirmed that each [c'(p, q)] is obtained by secret sharing of 0, it is confirmed that both [c(p, q)]=[a(p, q)]*[b(p, q)] and [c(1, q)]=[a(1, q)]*[b(1, q)] are computed correctly or erroneously. Both the values are ensured to be computed correctly at a high probability to some extent, and thus this confirmation processing confirms at a higher probability that both the values have been computed correctly. As K is larger, this confirmation processing is repeated more, it is confirmed at a higher probability that [c(1, q)]=[a(1, q)]*[b(1, q)] has been computed correctly. Even if multiplication triplet bucket verification is not included, a fraud is discovered at a ratio ensured by sampling confirmation. Therefore, if it is not necessary to discover a fraud at a high probability, this processing can be eliminated.

As described above, it is possible to generate columns of multiplication triplets ([a(1, q)], [b(1, q)], [c(1, q)]) that are ensured to be correct at an arbitrary probability by selecting a number of K. Respective elements of the columns are obtained for q=1, ..., K.

(Semi-Honest Circuit Computation)

Figure 7:
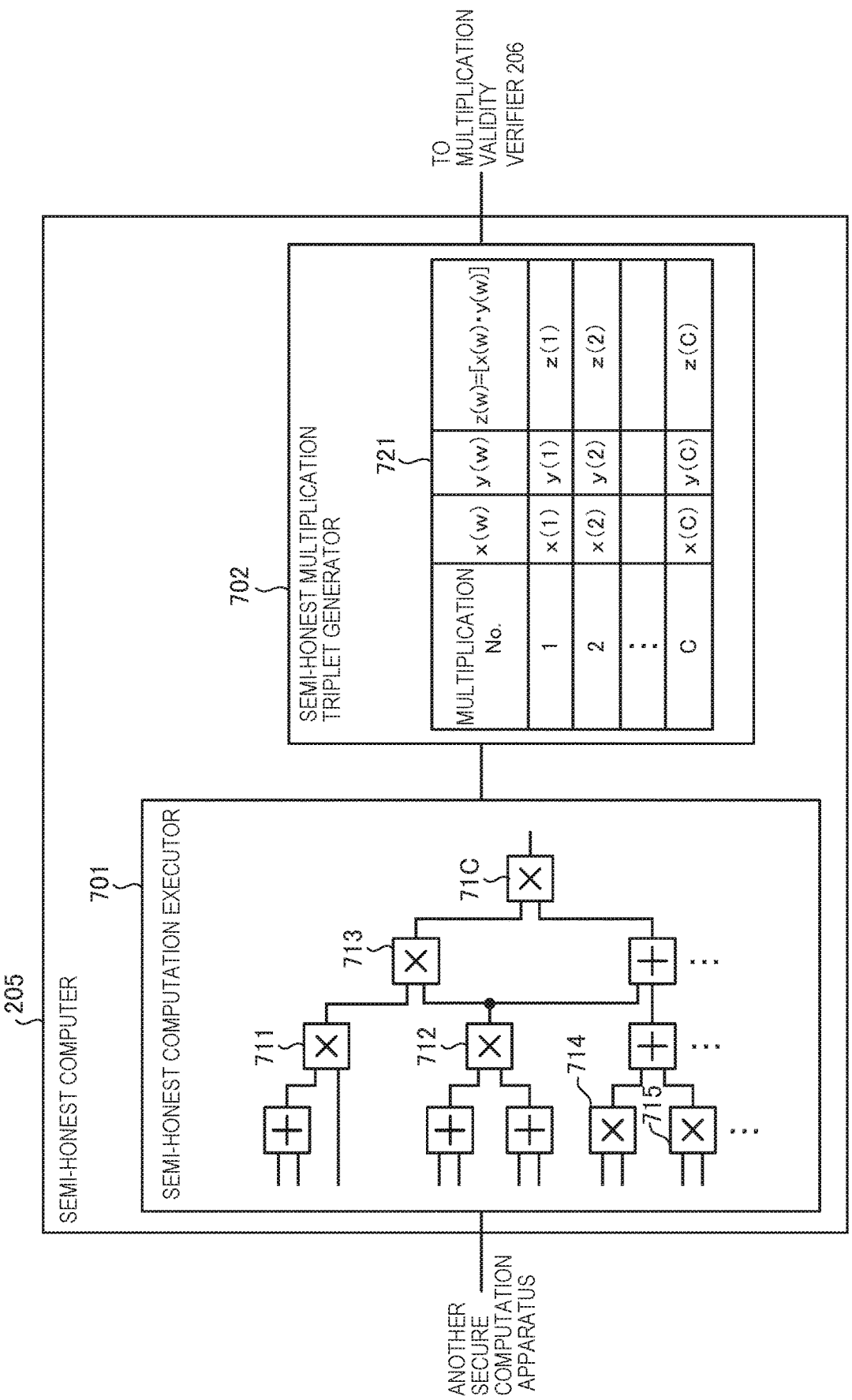
FIG. 7 is a block diagram showing the functional arrangement of a semi-honest computing module according to the second example embodiment of the present invention.

FIG. 7 is a block diagram showing the functional arrangement of the semi-honest computing module 205 according to this example embodiment.

The semi-honest computing module 205 includes a semi-honest computation executor 701 and a semi-honest multiplication triplet generator 702. The semi-honest computation executor 701 executes desired secure computation by sequentially connecting additions and multiplications. Note that in secure computation of secure distribution numbers, information is exchanged between a plurality of secure computation apparatuses only in secure multiplication (to also be referred to as a multiplication circuit hereinafter), and thus the validity is verified only for multiplication processing. For example, multiplication processes 711, 712, 713, 714, 715, ..., 71C of the semi-honest computation executor 701 are to undergo validity verification. The semi-honest multiplication triplet generator 702 generates, for example, multiplication triplet columns {x(w), y(w), z(w)= [X(w)·y(w)] } 721 corresponding to C semi-honest multiplication operations of the multiplication processes 711 to 71C.

An example of semi-honest circuit computation according to this example embodiment will be described below.

It is assumed that a circuit formed from multiplications and additions is provided. The input to this circuit is securely distributed. Addition of secure computation and multiplication of semi-honest safe secure computation are sequentially applied from the input of the circuit to its output, thereby generating secure distribution of the output result. Since multiplication requires communication, if at least a participant commits a fraud, the secure distribution of participants who have performed computation honestly may not provide a correct computation result.

To cope with this, it is verified that all multiplication operations included in the circuit have been executed correctly.

(Multiplication Validity Verification)

Figure 8:
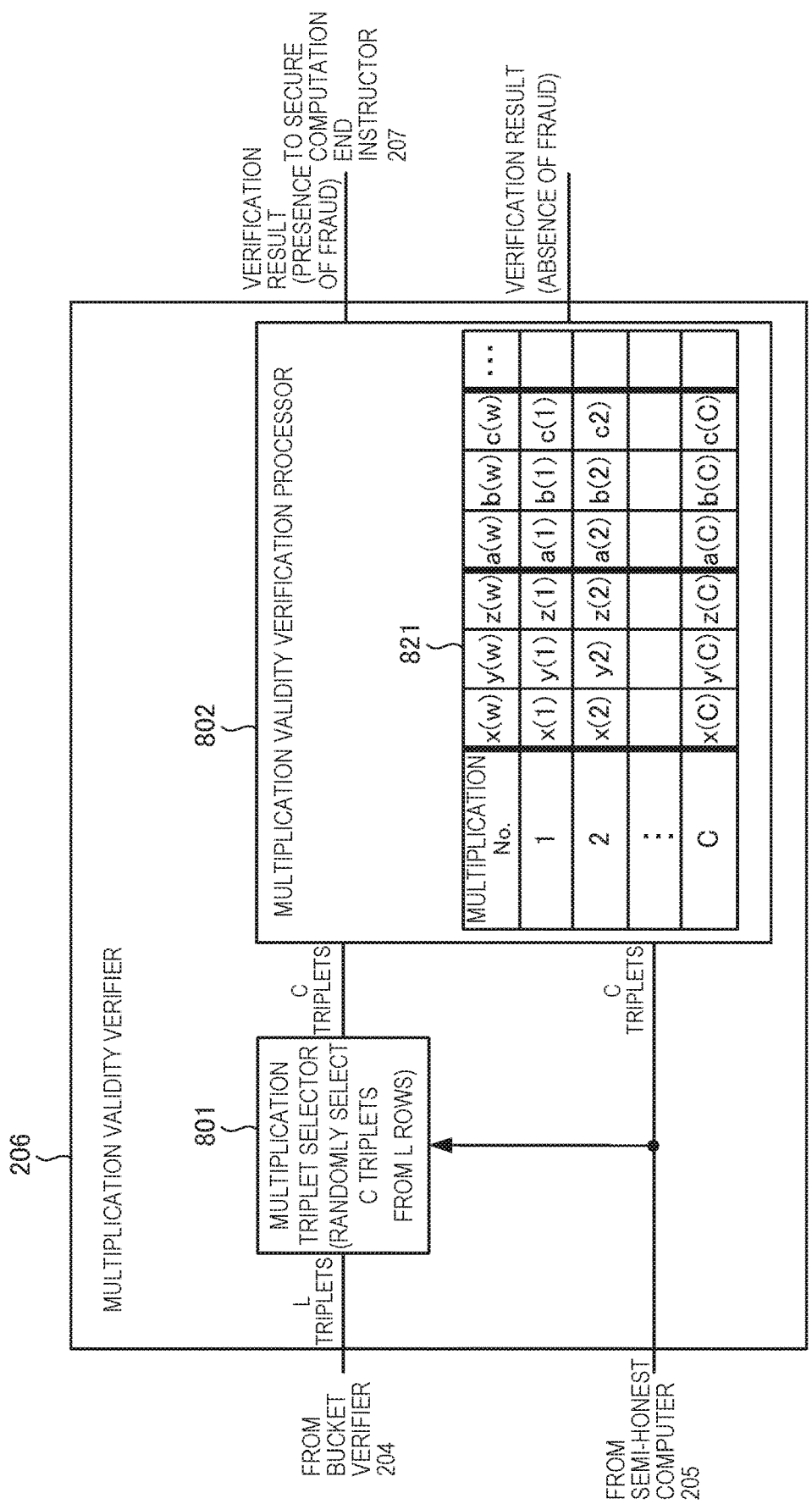
FIG. 8 is a block diagram showing the functional arrangement of a multiplication validity verifier according to the second example embodiment of the present invention.

FIG. 8 is a block diagram showing the functional arrangement of the multiplication validity verifier 206 according to this example embodiment.

The multiplication validity verifier 206 includes a multiplication triplet selector 801 and a multiplication validity verification processing module 802. The multiplication triplet selector 801 receives the L rows of multiplication triplets generated by the bucket verifier 204, and randomly selects, from the L rows of multiplication triplets, C rows of multiplication triplets as many as C multiplication processes (multiplication circuits). The multiplication validity verification processing module 802 randomly combines the C rows of multiplication triplets generated from C multiplication results from the semi-honest computing module 205 and the C rows of multiplication triplets generated from C random numbers randomly selected by the multiplication triplet selector 801, thereby generating columns {(x(w), y(w), z(w)), (a(w), b(w), c(w))} 821 of combined sets of multiplication triplets. The multiplication validity verification processing module 802 performs multiplication validity verification by the same method as in the bucket verification processing module 604.

An example of the multiplication validity verification processing according to this example embodiment will be described below.

The number of multiplication operations forming the circuit is represented by C, and ordinal numbers 1 to C are assigned to the multiplication operations. Each multiplication operation receives two values and outputs one value. It is assumed that the input values of the w-th multiplication operation are [x(w)] and [y(w)], and the output value of the w-th multiplication operation is [z(w)]. [x(w)] and [y(w)] for some w are input to the circuit and [z(w)] for some w are output from the circuit.

The C rows of multiplication triplets are randomly selected from the L rows of multiplication triplets generated in the bucket verification processing, and the order of the C rows of multiplication triplets is randomly changed. Although the order of the C rows of multiplication triplets is randomly changed, it is important to only assign, to each gate, each multiplication triplet randomly selected from the L rows of multiplication triplets. Therefore, processing of randomly selecting one of the L rows of multiplication triplets every time each multiplication gate is verified may be performed. If validity verification of each gate of the circuit is performed using predetermined multiplication triplets without randomly selecting the multiplication triplets after computation of the circuit, it is possible to fraudulently generate a multiplication triplet without being discovered even at a low probability. In this case, fraudulent computation can be performed by selecting a gate to be verified using the multiplication triplet.

As a result, the obtained multiplication triplet columns are represented by ($[a(w)], [b(w)], [c(w)]$) for $w=1, \ldots, C$. For all $w=1, \ldots, C$, secure computation of $[d(w)]=[a(w)]+[x(w)]$ and $[e(w)]=[b(w)]+[y(w)]$ is performed, and semi-honest reconstruction is performed to obtain $d(w)$ and $e(w)$. A reconstruction result obtained by the f-th participant is represented by $d(w, f)$ and $e(w, f)$. The f-th participant performs the following secure computation using $d(w, f)$ and $e(w, f)$ as $d(w)$ and $e(w)$.

$$[c'(w)]=[c(w)]-d(w)\cdot e(w)+[x(w)]\cdot e(w)+[y(w)]\cdot d(w)-[z(w)]$$

Then, for all $w=1, \ldots, C$, it is confirmed that $d(w, f)$ and $e(w, f)$ are not different depending on f. For example, this is executed, as follows.

With respect to a combination of each f-th participant and an f'-th participant, for all $w=1, \ldots, C$, it is confirmed that $d(w, f)$ and $d(w, f')$ are equal to each other.

It is assumed that $D(w, f)$ is obtained by arranging all $d(w, f)$ for $w=1, \ldots, C$. Each f-th participant and the f'-th participant share a secret key S only between them, the hash value of $(S, D(w, f))$ and that of $(S, D(w, f'))$ are computed and exchanged, and then it is confirmed that the hash values are equal to each other.

For all $w=1, \ldots, C$, it is confirmed that $[c'(w)]$ is obtained by secret sharing of 0. For example, this confirmation processing is performed by the same method as the above-described method of confirming that $[c'(i, j)]$ is obtained by secret sharing of 0 for all $i=1, \ldots, L$ and $j=2, \ldots, K$ has been described above. If it turns out that a value other than 0 is included, it is determined that a fraud is discovered, thereby ending the program.

If secure distribution values are 0, it is confirmed that both $[c(w)]=[a(w)]*[b(w)]$ and $[z(w)]=[x(w)]*[y(w)]$ are computed correctly or erroneously. The former is ensured to be computed correctly at a high probability to some extent, and thus this confirmation processing confirms at a high probability that the latter has also been computed correctly. In this way, it is confirmed that each multiplication operation of the circuit undergoes secure computation correctly. In addition processing, no communication is used, and a participant has no chance to send false data to another participant, and thus cannot commit a fraud. Therefore, it is verified that the overall circuit undergoes secure computation correctly.

(Secure Computation End Processing)

Figure 9:
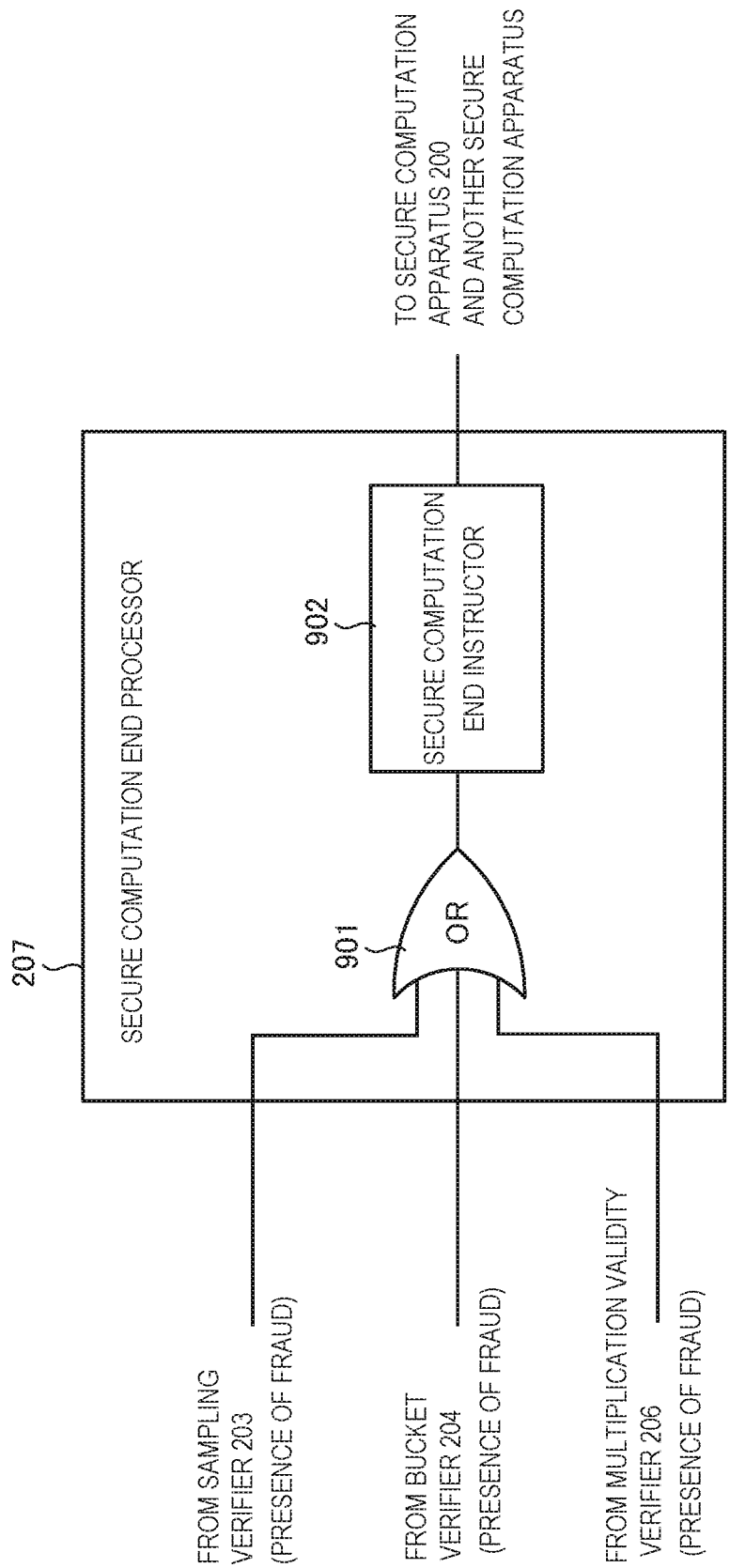
FIG. 9 is a block diagram showing the functional arrangement of a secure computation end processing module according to the second example embodiment of the present invention.

FIG. 9 is a block diagram showing the functional arrangement of the secure computation end processing module 207 according to this example embodiment.

The secure computation end processing module 207 includes an OR circuit 901 and a secure computation end instructor 902. The OR circuit 901 receives verification results of "presence of fraud" from the sampling verifier 203, the bucket verifier 204, and the multiplication validity verifier 206, and outputs an OR of the verification results. If "presence of fraud" is received from one of the sampling verifier 203, the bucket verifier 204, and the multiplication validity verifier 206, the secure computation end instructor 902 notifies the secure computation apparatus 200 and another secure computation apparatus of a secure computation end instruction signal.

<<Hardware Arrangement of Secure Computation Apparatus>>

FIG. 10A is a block diagram showing the hardware arrangement of the secure computation apparatus 200 according to this example embodiment.

In FIG. 10A, a CPU (Central Processing Unit) 1010 is an arithmetic control processor, and implements the functional components shown in FIG. 2 by executing a program. The CPU 1010 may include a plurality of processors to execute different programs, modules, tasks or threads, in parallel. A ROM (Read Only Memory) 1020 stores permanent data such as initial data and a program, and programs. A network interface 1030 controls communication with a plurality of secure computation apparatuses or a secure distribution apparatus via a network.

A RAM (Random Access Memory) 1040 is a random access memory used as a temporary storage work area by the CPU 1010. An area to store data necessary for implementation of the example embodiment is allocated to the RAM 1040. Sampled triplets (M) 1041 store M sampled multiplication triplets for sampling verification. A sampling verification result 1042 stores data indicating the presence/absence of a fraud obtained by sampling verification. A triplet array (L x K) 1043 stores a multiplication triplet array of L rows x M columns for bucket verification. A bucket verification result 1044 stores data indicating the presence/absence of a fraud obtained by bucket verification. Semi-honest multiplication triplets (C) 1045 store C multiplication triplets based on semi-honest multiplication for multiplication validity verification. Randomly selected triplets (C) 1046 from the triplet array store C multiplication triplets randomly selected from the triplet array (L x K) 1043. A multiplication validity verification result 1047 stores data indicating the presence/absence of a fraud obtained by multiplication validity verification. A secure computation end flag 1048 stores a flag for ending secure computation when one of the sampling verification result 1042, the bucket verification result 1044, and the multiplication validity verification result 1047 indicates the presence of a fraud. A secure computation area 1049 is an area temporarily used by the secure computation apparatus 200 to perform secure computation.

A storage 1050 stores a database, various parameters, or the following data or programs necessary for implementation of the example embodiment. Random numbers (random number distribution values) 1051 are random numbers to be used to generate multiplication triplet columns. Secure multiplication verification parameters 1059 are set or computed for secure multiplication verification executed in this example embodiment. Multiplication triplet columns (LK+M) 441 indicate multiplication triplet columns described with reference to FIG. 4.

The storage 1050 stores the following programs. A secure computation control program 1052 is a program that controls secure computation by the secure computation apparatus 200. A secure addition module 1053 is a module that performs secure addition using secure distribution numbers. A secure multiplication module 1054 is a module that performs secure multiplication using secure distribution numbers. A multiplication triplet column generation module 1055 is a module that generates a number of multiplication triplet columns based on random numbers. A sampling verification module 1056 is a module that performs verification by sampling multiplication triplets from the multiplication triplet columns. A bucket verification module 1057 is a module that performs verification by generating a multiplication triplet array from non-sampled multiplication triplets of the multiplication triplet columns. A multiplication validity verification module 1058 is a module that performs verification using multiplication triplets generated from a semi-honest multiplication result, and multiplication triplets, as many as the generated multiplication triplets, which are randomly selected from the multiplication triplet array.

Note that programs and data that are associated with the general-purpose functions of the secure computation apparatus 200 and other feasible functions are not shown in the RAM 1040 or the storage 1050 of FIG. 10.

(Secure Multiplication Verification Parameter)

FIG. 10B is a table showing contents of the secure multiplication verification parameter 1059 according to this example embodiment. The secure multiplication verification parameter 1059 is a parameter set or computed for multiplication triplet generation, sampling verification, bucket verification, or multiplication validity verification. Note that the secure multiplication verification parameter 1059 is not limited to that shown in FIG. 10B.

The secure multiplication verification parameter 1059 is stored or accumulated for learning by associating a secure multiplication condition 1061, a selection parameter 1062, and a validity verification result 1063 with each other. The secure computation apparatus 200 selects a parameter more appropriate for a verification speed and verification accuracy using the secure multiplication verification parameter 1059. The secure computation apparatus 200 selects a desired parameter from accumulated information in the secure multiplication verification parameter 1059, and notifies an operator of it.

The secure multiplication condition 1061 includes a range of numerical values to undergo secure multiplication, a bit width, a secure multiplication algorithm to be used, and target validity determination accuracy. The selection parameter 1062 includes the number of triplets (LK+M) generated from random numbers, a sampling count (M) in sampling verification, the numbers of rows and columns of the triplet array (L rows x K columns) in bucket verification, and a secure multiplication count (C) in secure arithmetic processing. The validity verification result 1063 includes a verification speed including a communication amount, and validity accuracy.

<<Processing Procedure of Secure Computation Apparatus>>

Figure 11:
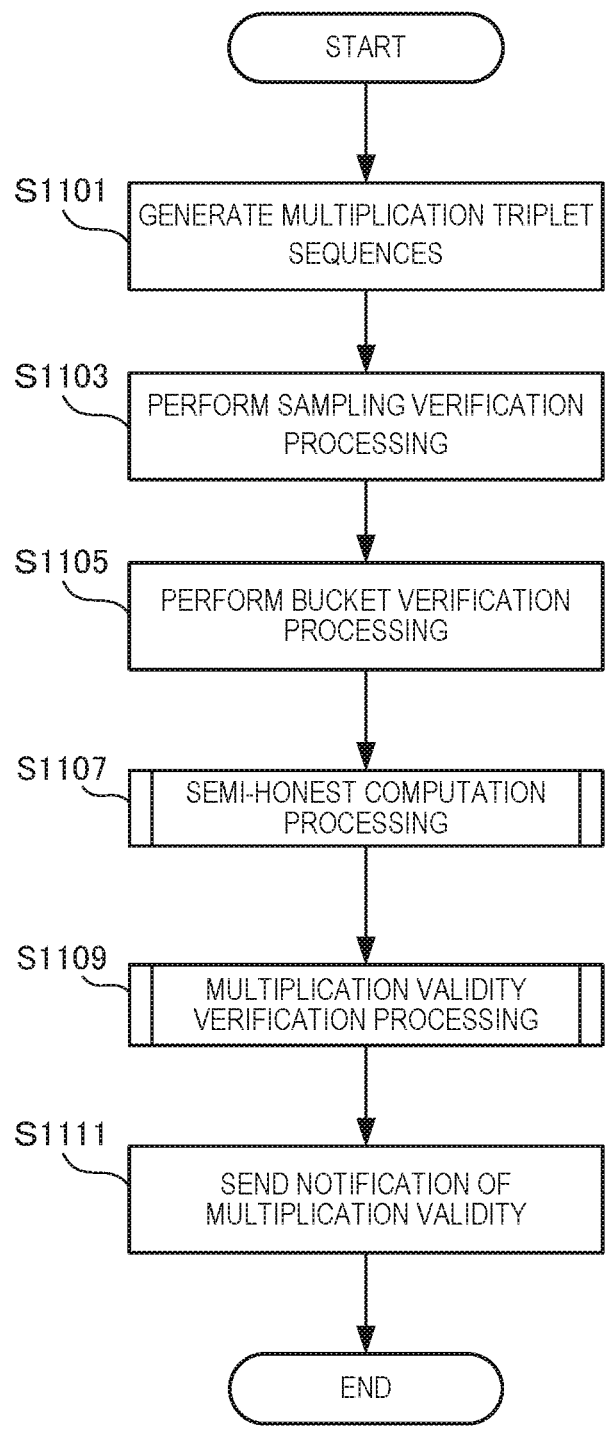
FIG. 11 is a flowchart illustrating the processing procedure of the secure computation apparatus according to the second example embodiment of the present invention.

FIG. 11 is a flowchart illustrating the processing procedure of the secure computation apparatus 200 according to this example embodiment. This flowchart is executed by the CPU 1010 of FIG. 10 using the RAM 1040, thereby implementing the functional components shown in FIG. 2.

In step S1101, the secure computation apparatus 200 generates (LK+M) multiplication triplet columns. In step S1103, the secure computation apparatus 200 randomly samples M multiplication triplets from the (LK+M) multiplication triplet columns, thereby verifying a fraud at the time of communication of secure multiplication. In step S1105, the secure computation apparatus 200 generates a multiplication triplet array of L rows x K columns using LK non-sampled multiplication triplets in the (LK+M) multiplication triplet columns, thereby verifying a fraud at the time of communication of secure multiplication.

In step S1107, the secure computation apparatus 200 executes semi-honest computation to generate C multiplication triplets corresponding to C multiplication processes. In step S1109, the secure computation apparatus 200 randomly selects, from the multiplication triplet array of L rows x K columns, multiplication triplets as many as C multiplication triplets, thereby verifying a fraud at the time of communication of a secure multiplication result. In step S1111, the secure computation apparatus 200 sends a notification of a multiplication validity verification result.

(Semi-Honest Processing and Multiplication Validity Verification Processing)

Figure 12:
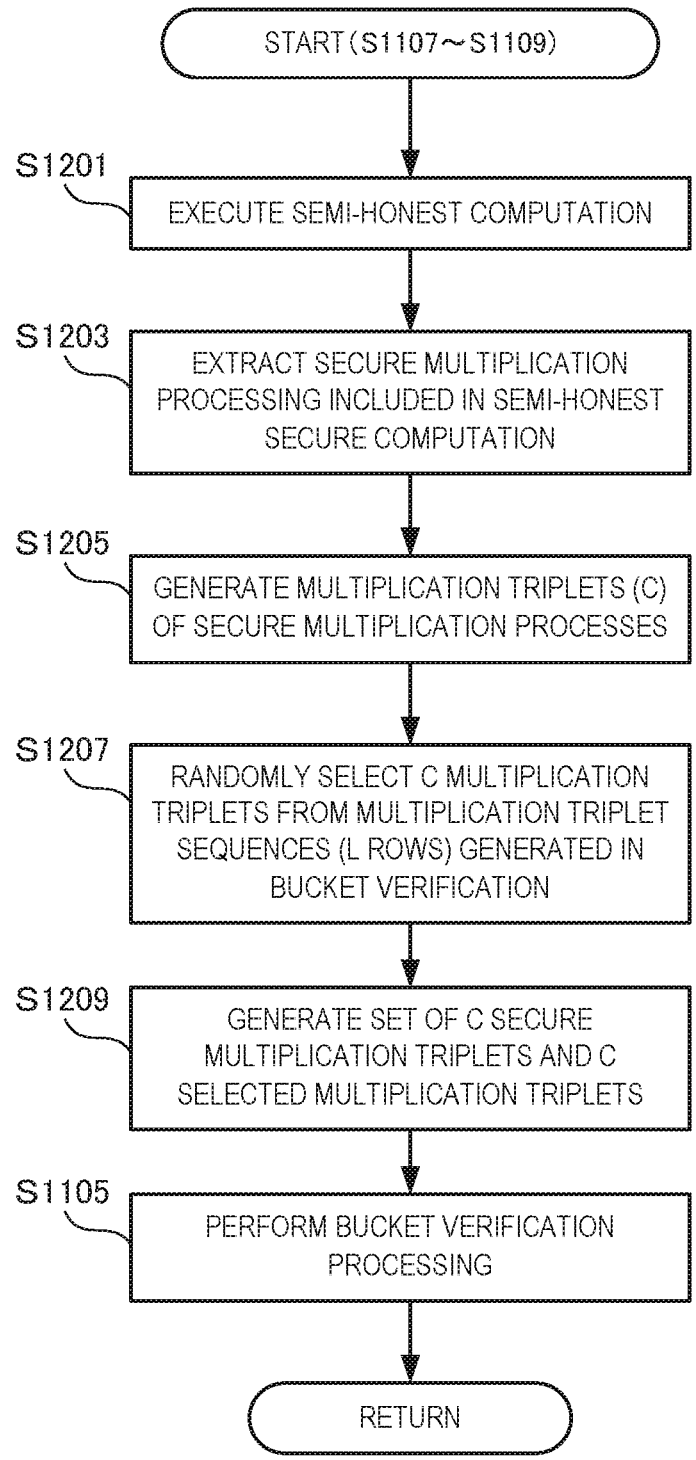
FIG. 12 is a flowchart illustrating the procedure of semi-honest computation processing and multiplication validity verification processing according the second example embodiment of the present invention.

FIG. 12 is a flowchart illustrating the procedure of the semi-honest computation processing (S1107) and the multiplication validity verification processing (S1109) according to this example embodiment.

In step S1201, the secure computation apparatus 200 executes semi-honest secure computation. In step S1203, the secure computation apparatus 200 extracts secure multiplication processes included in the semi-honest secure computation. In step S1205, the secure computation apparatus 200 generates multiplication triplets as many as secure multiplication processes. In step S1207, the secure computation apparatus 200 randomly selects multiplication triplets as many as secure multiplication processes from the multiplication triplet columns (L rows) generated in bucket verification. In step S1209, the secure computation apparatus 200 generates a set of secure multiplication triplets and selected multiplication triplets, the numbers of which are equal to each other. In step S1105 in similar to FIG. 11, the secure computation apparatus 200 performs bucket verification using the set of secure multiplication triplets and selected multiplication triplets, the numbers of which are equal to each other.

According to this example embodiment, by using sampling verification and bucket verification based on multiplication triplets and multiplication validity verification based on multiplication triplets from semi-honest multiplication, it is possible to protect a security more accurately against the malicious behavior of participants of secure computation while maintaining a processing amount small in secure computation.

More specifically, assume that when M multiplication triplets are reconstructed from the LK+M multiplication triplets to perform verification, it can be computed that the probability that the number of fraudulently generated multiplication triplets is 1/T or less is very high or overwhelming.

Therefore, when the multiplication triplets are narrowed down to the LK multiplication triplets, it can be determined that the probability that the number of fraudulently generated multiplication triplets is $1/T^K$ or less is very high or overwhelming.

In the above computation processing, since the number of times communication is performed for semi-honest reconstruction is proportional to K, it is desirable to make K small to reduce a communication amount. However, if K is made small, the upper limit of the number of fraudulently generated multiplication triplets ensured at a high probability becomes large. Consider a case in which K is made relatively small to reduce the communication amount, and $1/T^K$ is too small to commit a fraud intentionally if a fraud is found only at a probability of $1/T^K$ but about $T^K$ multiplication operations are computed. If the C multiplication triplets are not randomly selected from the L multiplication triplets after computation of the circuit, it is apparent at the time of computation of the circuit that each specific multiplication operation is inspected with respect to a specific multiplication triplet. If, as described above, K is small, fraudulently generated multiplication triplets can exist, and even if a participant commits a fraud in multiplication inspected using the multiplication triplets, this is not discovered. On the other hand, if, as described above, the multiplication triplets are randomly selected, the probability of performing inspection using fraudulently generated multiplication triplets is as low as $1/T^K$, and the probability that a fraud can be concealed to the end is low.

Even if the C multiplication triplets are not randomly selected, if $1/T^K$ is sufficiently or negligibly small by increasing K, there is no problem. Conversely, as an effect obtained by randomly selecting the multiplication triplets, K can be made small. That is, in secure computation in which a fraud can be detected, the communication amount can be reduced.

Third Example Embodiment

A secure computation apparatus according to the third example embodiment of the present invention will be described next. The secure computation apparatus according to this example embodiment is different from the above-described second example embodiment in that verification is performed by sampling verification and multiplication validity verification without using bucket verification. The remaining components and operations are the same as those in the second example embodiment. Hence, the same reference numerals denote the same components and operations, and a detailed description thereof will be omitted.

<<Functional Arrangement of Secure Computation Apparatus>>

Figure 13:
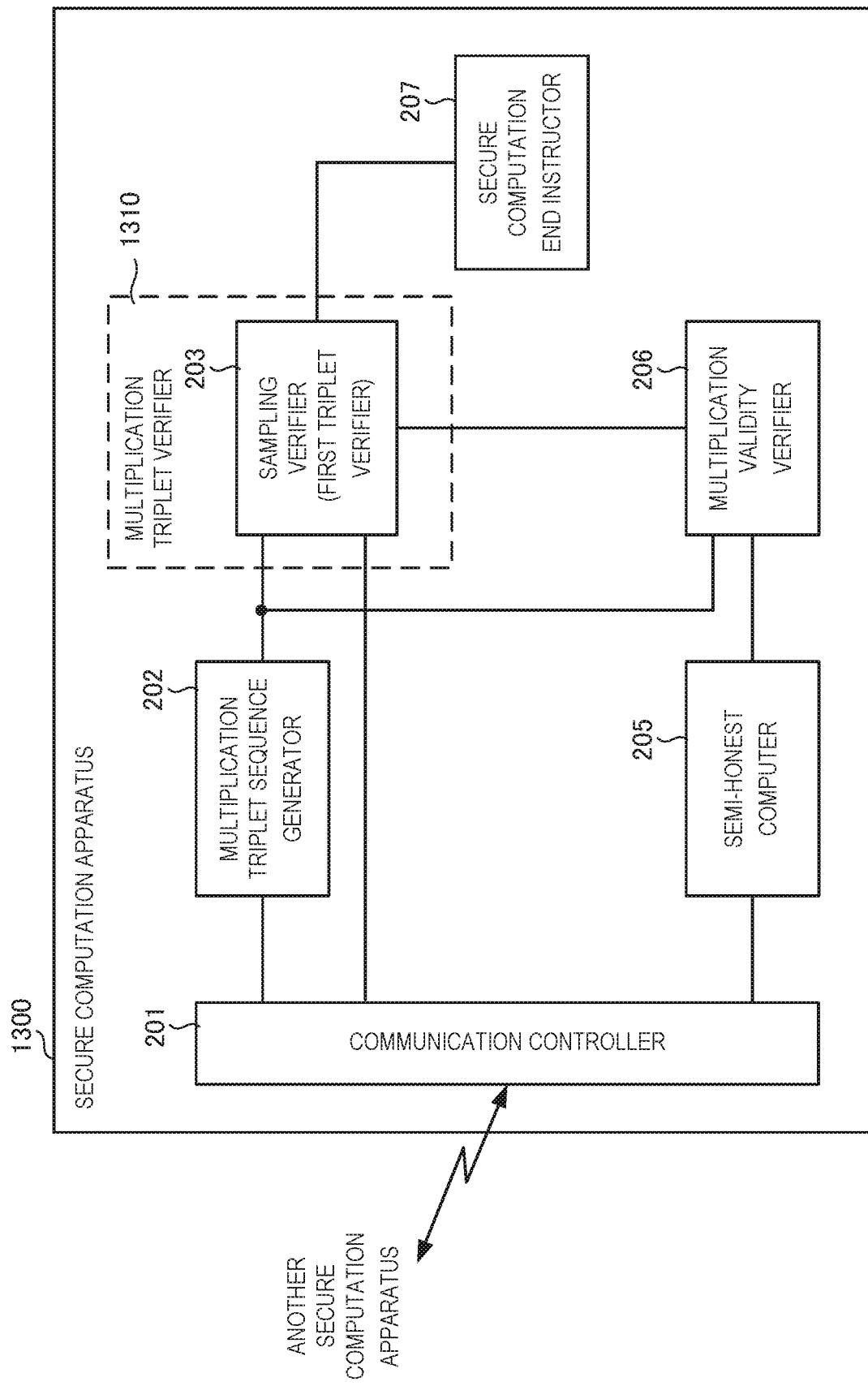
FIG. 13 is a block diagram showing the functional arrangement of a secure computation apparatus according to the third example embodiment of the present invention.

FIG. 13 is a block diagram showing the functional arrangement of a secure computation apparatus 1300 according to this example embodiment. In FIG. 13, the same reference numerals as in FIG. 2 denote the same functional components and a repetitive description thereof will be omitted. That is, in FIG. 13, a multiplication triplet verifier 1310 is formed by eliminating the bucket verifier 204 from the multiplication triplet verifier 210 shown in FIG. 2. The remaining functional components are the same and a detailed description thereof will be omitted.

According to this example embodiment, since the bucket verifier is eliminated, it is difficult to achieve the same accuracy and processing amount as in the second example embodiment. However, it is possible to sufficiently, accurately protect a security against the malicious behavior of a participant with the simpler arrangement.

Fourth Example Embodiment

A secure computation apparatus according to the fourth example embodiment of the present invention will be described next. The secure computation apparatus according to this example embodiment is different from the above-described second and third example embodiments in that verification is performed by reversing the order of bucket verification and multiplication validity verification. The remaining components and operations are the same as those in the second example embodiment. Hence, the same reference numerals denote the same components and operations, and a detailed description thereof will be omitted.

<<Functional Arrangement of Secure Computation Apparatus>>

Figure 14:
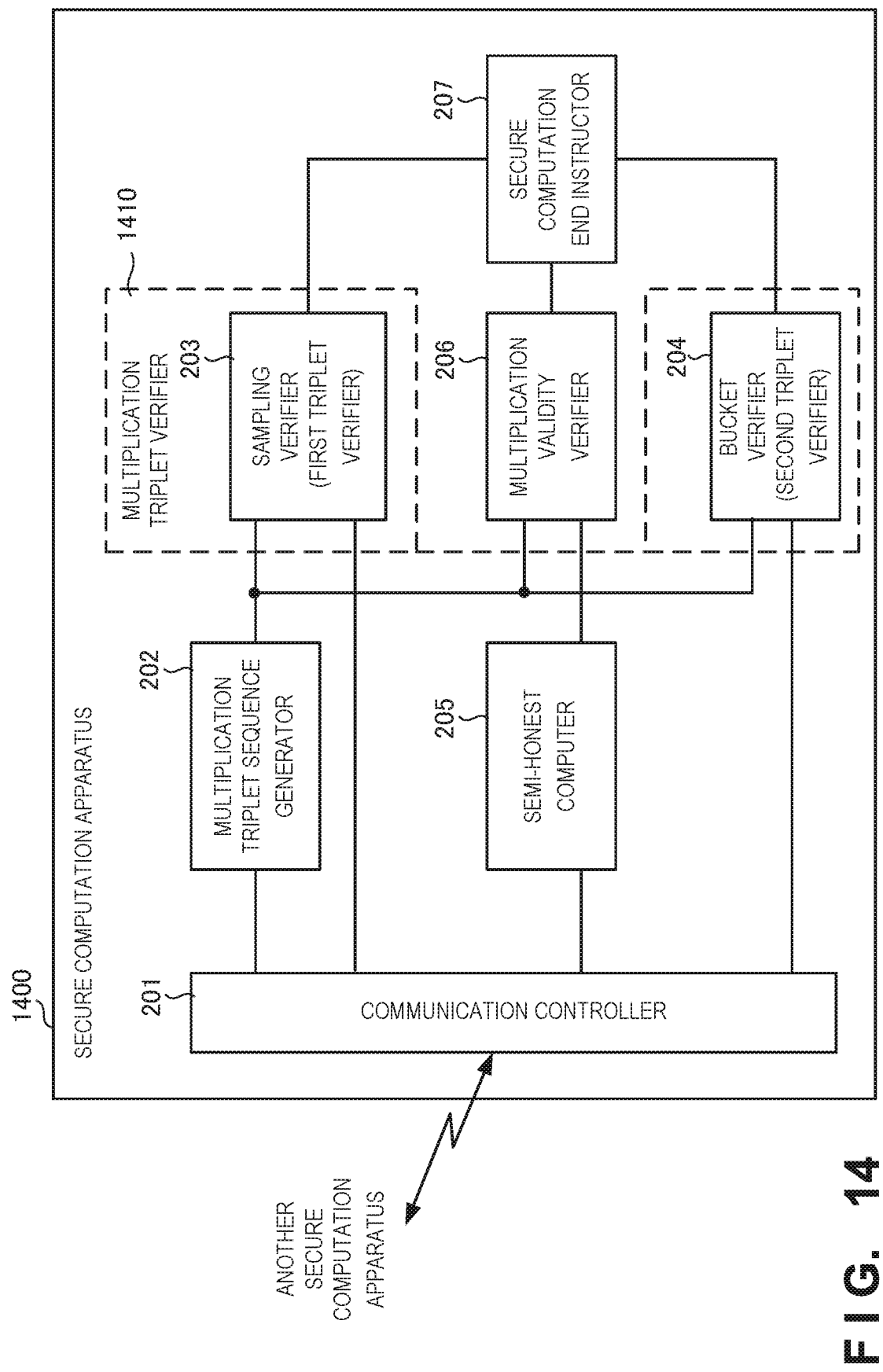
FIG. 14 is a block diagram showing the functional arrangement of a secure computation apparatus according to the fourth example embodiment of the present invention.

FIG. 14 is a block diagram showing the functional arrangement of a secure computation apparatus 1400 according to this example embodiment. In FIG. 14, the same reference numerals as in FIG. 2 or 13 denote the same functional components and a repetitive description thereof will be omitted. That is, in FIG. 14, a multiplication triplet verifier 1410 is formed by moving the bucket verifier 204 of the multiplication triplet verifier 210 shown in FIG. 2. The remaining functional components are the same and a detailed description thereof will be omitted.

According to this example embodiment, the order of bucket verification and multiplication validity verification is reversed. However, it is possible to achieve the same accuracy and processing amount as in the second example embodiment, and to protect a security accurately against the malicious behavior of a participant.

Other Example Embodiments

As described above, according to the present invention, it is possible to perform addition and multiplication while concealing data from each apparatus by distributing data to a plurality of apparatuses, and to compute an arbitrary function. Furthermore, even if a participating apparatus commits a fraud, this can be detected. A communication amount and a computation amount necessary for this computation processing are small. Such system can prevent the administrator of a given apparatus from stealing secret data when providing a service using the data in the apparatus. This is because if different administrators are assigned to a plurality of apparatuses, there is no administrator who can see data in all the apparatuses by himself/herself, thereby contributing to prevention of stealing data by the administrator.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a secure computation program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. A secure computation apparatus comprising:
a first multiplication triplet column generator that generates first multiplication triplet columns formed from a set of two secure distribution random numbers and a distribution value of a multiplication result obtained by performing secure multiplication of the two secure distribution random numbers;
a second multiplication triplet column generator that generates second multiplication triplet columns formed from a set of two secure distribution input numbers and a distribution value of a multiplication result obtained by performing secure multiplication of the two secure distribution input numbers, in each multiplication process of semi-honest safe secure multiplication; and
a multiplication validity verifier that generates a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifies validity of secure multiplication based on the set of the first and second multiplication triplets.

2. The secure computation apparatus according to claim 1, further comprising a multiplication triplet verifier that verifies a fraud from a predetermined number of rows of first multiplication triplets randomly selected from the first multiplication triplet columns,
 wherein if said multiplication triplet verifier discovers no fraud, said multiplication validity verifier verifies the validity of the secure multiplication.

3. The secure computation apparatus according to claim 2, wherein said multiplication triplet verifier includes a first triplet verifier that randomly samples a first number of rows of first multiplication triplets from the first multiplication triplet columns, and verifies a fraud based on the sampled multiplication triplets.

4. The secure computation apparatus according to claim 3, wherein the first number is determined in correspondence with accuracy with which said first triplet verifier verifies a fraud.

5. The secure computation apparatus according to claim 4, wherein said multiplication triplet verifier includes a second triplet verifier that, if said first triplet verifier discovers no fraud, generates a random multiplication triplet array having at least two columns using non-sampled first multiplication triplets, and verifies a fraud based on the random multiplication triplet array of the first multiplication triplets.

6. The secure computation apparatus according to claim 5, wherein a number of columns of the random multiplication triplet array is determined in correspondence with accuracy with which said second triplet verifier verifies a fraud.

7. The secure computation apparatus according to claim 3, wherein said multiplication triplet verifier includes a second triplet verifier that, if said first triplet verifier discovers no fraud, generates a random multiplication triplet array having at least two columns using non-sampled first multiplication triplets, and verifies a fraud based on the random multiplication triplet array of the first multiplication triplets.

8. The secure computation apparatus according to claim 7, wherein a number of columns of the random multiplication triplet array is determined in correspondence with accuracy with which said second triplet verifier verifies a fraud.

9. A secure computation method comprising:
 generating first multiplication triplet columns formed from a set of two secure distribution random numbers and a distribution value of a multiplication result obtained by performing secure multiplication of the two secure distribution random numbers;
 generating second multiplication triplet columns formed from a set of two secure distribution input numbers and a distribution value of a multiplication result obtained by performing secure multiplication of the two secure distribution input numbers, in each multiplication process in semi-honest safe secure multiplication; and
 generating a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifying validity of secure multiplication based on the set of the first and second multiplication triplets.

10. A non-transitory computer-readable storage medium storing a secure computation program for causing a computer to execute a method, comprising:
 generating first multiplication triplet columns formed from a set of two secure distribution random numbers and a distribution value of a multiplication result obtained by performing secure multiplication of the two secure distribution random numbers;
 generating second multiplication triplet columns formed from a set of two secure distribution input numbers and a distribution value of a multiplication result obtained by performing secure multiplication of the two secure distribution input numbers, in each multiplication process in semi-honest safe secure multiplication; and
 generating a set of first multiplication triplets and second multiplication triplets by randomly selecting, from the first multiplication triplet columns, a number of rows of the first multiplication triplets as many as a number of rows of the second multiplication triplets in the second multiplication triplet columns, and verifying validity of secure multiplication based on the set of the first and second multiplication triplets.

* * * * *